US012650372B2

(12) United States Patent
Zankoor et al.

(10) Patent No.: US 12,650,372 B2
(45) Date of Patent: Jun. 9, 2026

(54) METHOD AND SYSTEM FOR AUTOMATED IN-SITU CAPILLARY PRESSURE AND WETTABILTY CHARACTERIZATION OF POROUS MEDIA

(71) Applicant: UNIVERSITY OF WYOMING, Laramie, WY (US)

(72) Inventors: Ahmed Zankoor, Fort Collins, CO (US); Mahdi Khishvand, Laramie, WY (US); Mohammad Piri, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 387 days.

(21) Appl. No.: 18/206,708

(22) Filed: Jun. 7, 2023

(65) Prior Publication Data

US 2023/0400401 A1     Dec. 14, 2023

Related U.S. Application Data

(60) Provisional application No. 63/350,673, filed on Jun. 9, 2022.

(51) Int. Cl.
| | |
|---|---|
| *G01N 15/08* | (2006.01) |
| *G06V 10/26* | (2022.01) |
| *G06V 10/34* | (2022.01) |
| *G06V 10/44* | (2022.01) |

(52) U.S. Cl.
CPC .............. *G01N 15/08* (2013.01); *G06V 10/26* (2022.01); *G06V 10/34* (2022.01); *G06V 10/44* (2022.01)

(58) Field of Classification Search
CPC ........ G06V 10/26; G06V 10/30; G06V 10/34; G06V 10/40; G06V 10/44; G06V 40/1347; G06V 40/1353; G06V 40/1365; G06V 40/1371; G06V 20/64; G01N 15/00; G01N 15/08; G01N 15/084; G01N 15/082;
(Continued)

(56) References Cited

U.S. PATENT DOCUMENTS

| | | | |
|---|---|---|---|
| 10,114,864 | B1 | 10/2018 | Torun |
| 2004/0204857 | A1 | 10/2004 | Ramamoorthy et al. |
| 2008/0208539 | A1 | 8/2008 | Lee et al. |

(Continued)

FOREIGN PATENT DOCUMENTS

| | | |
|---|---|---|
| CN | 112329358 A | 2/2021 |

OTHER PUBLICATIONS

Fourar, et al., A viscous coupling model for relative permeabilities in fractures, SCA-9825, 9 pages.
(Continued)

*Primary Examiner* — Oneal R Mistry
*Assistant Examiner* — Duy Tran
(74) *Attorney, Agent, or Firm* — Patterson + Sheridan, LLP

(57)     ABSTRACT

A method and system for non-destructive characterization of porous media samples are disclosed. The method for porous media characterization by one or more central processing units (CPUs) includes obtaining one or more segmented images from a set of images of a porous media sample, determining one or more fluid-fluid interfaces (FFIs) within one or more segmented images for each pixel of the one or more segmented images, and based at least in part on the FFIs, extracting one or more characteristics of the porous media sample.

19 Claims, 11 Drawing Sheets

(58) Field of Classification Search

CPC ....... G01N 15/0826; G01N 2015/0833; G01N
15/088; G01N 15/0893; G01N 2015/0846

See application file for complete search history.

(56) References Cited

U.S. PATENT DOCUMENTS

| | | | | |
|---|---|---|---|---|
| 2011/0181701 A1* | 7/2011 | Varslot | ................... | G06T 17/30 |
| | | | | 348/46 |
| 2013/0259190 A1 | 10/2013 | Walls et al. | | |
| 2013/0308831 A1* | 11/2013 | Dvorkin | ............... | G06T 7/0004 |
| | | | | 382/109 |
| 2014/0019054 A1 | 1/2014 | De Prisco et al. | | |
| 2015/0104078 A1 | 4/2015 | Varslot et al. | | |
| 2015/0374028 A1 | 12/2015 | Gindrat et al. | | |
| 2018/0121579 A1* | 5/2018 | Fredrich | ................... | G06T 7/11 |
| 2018/0253514 A1 | 9/2018 | Bryant et al. | | |
| 2018/0321127 A1 | 11/2018 | León Carrera et al. | | |
| 2019/0005172 A1* | 1/2019 | Riasi | ........................ | G06F 30/23 |
| 2019/0154597 A1 | 5/2019 | Zhang | | |
| 2019/0212241 A1* | 7/2019 | Crouse | ................... | G06F 30/20 |
| 2020/0110849 A1 | 4/2020 | Rabbani et al. | | |
| 2020/0309667 A1 | 10/2020 | Nie et al. | | |
| 2021/0018417 A1* | 1/2021 | Neumann Barros Ferreira | .......... | |
| | | | | G01N 13/00 |
| 2021/0208051 A1 | 7/2021 | Ju et al. | | |
| 2023/0407743 A1 | 12/2023 | Shoukry et al. | | |
| 2024/0070356 A1 | 2/2024 | Mccaskill et al. | | |
| 2024/0070357 A1 | 2/2024 | Mccaskill et al. | | |

OTHER PUBLICATIONS

Frette, et al., A semi-analytical model for computation of capillary entry pressures and fluid configurations in uniformly-wet pore spaces from 2d rock images. Advances in Water Resources 33, May 11, 2010, 21 pages.

Garing et al., Pore-scale capillary pressure analysis using multiscale x-ray micromotography, https://www.sciencedirect.com/science/article/pii/S0309170816305437, 2017, 38 pages.

Gesho, et al., Pore Network Extraction Algorithm and Geometrical Upscaling—Theoretical Description, Water Resource Research, Jun. 1, 2016, 39 pages.

Gjennestad, et al., Stable and Efficient Time Integration of a Dynamic Pore Network Model for Two-Phase Flow in Porous Media. Frontiers in Physics. Jun. 13, 2018, 16 pages.

Glass et. al., A modified invasion percolation model for low-capillary number immiscible displacements in horizontal rough-walled fractures: Influence of local in-plane curvature, Water Resources Research, vol. 34, No. 12, Dec. 1998, 20 pages.

Gong et. al., Dynamic pore-scale modeling of residual fluid configurations in disordered porous media, E3S Web of Conferences 366, 2013, https://doi.org/10.1051/e3sconf/202336601018, 13 pages.

Gong et. al., Dynamic pore-scale modeling of residual trapping in a rough-walled fracture, Transport in Porous Media, 140, May 11, 2021, 38 pages.

Gong et. al., Parallel dynamic pore-network modeling package for two-phase flow in fractures and solute transport in disordered porous media and rough-walled fractures, Dissertation, Jun. 23, 2001, 245 pages.

Gong, et al., Dynamic Pore-Scale Modeling of Residual Trapping Following Imbibition in a Rough-walled Fracture, Transport in Porous Media 140, May 11, 2021, 37 pages.

Gong, et al., Pore-to-Core Upscaling of Solute Transport Under Steady-State Two-Phase Flow Conditions Using Dynamic Pore Network Modeling Approach, Transport in Porous Media 135, Sep. 15, 2020, 38 pages.

Gong, et al., Two-Phase Relative Permeability of Rough-Walled Fractures: A Dynamic Pore-Scale Modeling of the Effects of Aperture Geometry, Water Resources Research, Nov. 18, 2021, 38 pages.

Gong, Dynamic pore network modeling of two-phase flow and solute transport in disordered porous media and rough-walled fractures, Dissertation, Dept of Petroleum Engineering, Aug. 2021, 245 pages.

Goodfellow, et al., Generative adversarial nets. Advances in Neural Information Processing Systems, https://www.github/com/goodfeli/adversarial, 9 pages.

Gostick, Versatile and efficient pore network extraction method using marker-based watershed segmentation, Phys Rev E, vol. 96, Aug. 16, 2017, 15 pages.

Guo et. al., Thermal drawdown-induced flow channelling in a single fracture in EGS, Geothermics 61, Jan. 28, 2016, 17 pages.

Hammond, et al., A Dynamic Pore Network Model for Oil Displacement by Wettability-Altering Surfactant Solution. Transp Porous Med 92, Jan. 10, 2012, 30 pages.

Hart et al, A Formal Basis for the Heuristic Determination of Minimum Cost Paths, IEEE Transactions on Systems Science and Cybernetics, vol. 4, No. 2, Jul. 1968, 8 pages.

Hassanizadeh et al, Thermodynamic basis of capillary pressure in porous media, Water resources research, Oct. 1993, 17 pages.

Hassler et al., Measurement of Capillary Pressures in Small Core Samples, Los Angeles Meeting Oct. 1944, 10 pages.

Helland et al, Characterization of pore shapes for pore network models, Proceedings of the 11th European Conference on the Mathematics of Oil Recovery (ECMOR XI), Sep. 2008, 13 pages.

Helland et al, Computation of fluid configurations and capillary pressures in mixed-wet 2d pore spaces from rock images, Proceedings of the XVIII International Conference on Water Resources, Jun. 2010, 12 pages.

Herring et al., Flow rate impacts on capillary pressure and interface curvature of connected and disconnected fluid phases during multiphase flow in sandstone, Advances in Water Resources 107, 2017, 10 pages.

Honarpour et al, Relative-permeability measurements: An overview, SPE Technology Today Series, Aug. 1988, 4 pages.

Huang et al, Water Slippage versus Contact Angle: A Quasiuniversal Relationship. Phys. Rev. Lett. 101 226101, Nov. 28, 2008, 4 pages.

Hughes et al, Network modeling of multiphase flow in fractures, Advances in Water Resources 24, 2001, 13 pages.

Hughes et al, Pore Scale Modeling of Rate Effects in Imbibition, Transport in Porous Media 40, 2000, 29 pages.

Hui et al, Effects of wettability on three-phase flow in porous media, The Journal of Physical Chemistry B 104, Feb. 17, 2000, 13 pages.

Huo et al, Experimental investigation of stress-dependency of relative permeability in rock fractures, Transp Porous Med 113, 2016, 25 pages.

Ibekwe et al, Automated extraction of in situ contact angles from micro-computed tomography images of porous media, Computers and Geosciences 137, Feb. 3, 2020, 12 pages.

Idowu, et al., Pore-Scale Modelling of Rate Effects in Waterflooding. Transport in Porous Media 83, 2010, 20 pages.

Joekar-Niasar et. al., Insights into the relationships among capillary pressure, saturation, interfacial area and relative permeability using pore-network modeling, Transp Porous Med 74, 2008, 20 pages.

Kang et al, Lattice Boltzmann pore-scale model for multicomponent reactive transport in porous media, Journal of Geophysical Research: Solid Earth 111, 2006, 12 pages.

Kang et al, Minimized Capillary End Effect During CO2 Displacement in 2-D Micromodel by Manipulating Capillary Pressure at the Outlet Boundary in Lattice Boltzmann Method, Water Resources Research 54, 2018, 21 pages.

Karpyn et. al., Visualization of fluid occupancy in a rough fracture using micro-tomography, Journal of Colloid and Interface Science 307, 2007, 7 pages.

Karpyn, et al., Prediction of fluid occupancy in fractures using network modeling and x-ray microtomography. I: Data conditioning and model description, Physical Review E 76, 016315, Jul. 31, 2007, 13 pages.

Karypis et al, A fast and high quality multilevel scheme for partitioning irregular graphs, Society for Industrial and Applied Mathematics Journal vol. 20 No. 1, 1998, 35 pages.

Keller et al., Behavior of nonaqueous phase liquids in fractured porous media under two-phase flow conditions, Transport in Porous Media 38, 2000, 16 pages.

(56) References Cited

OTHER PUBLICATIONS

Khishvand, et al., An Improved Insight into Low-Salinity Waterflooding: In-Situ Characterization of Wettability Alteration at Elevated Pressure and Temperature Conditions, SCA2016_Temp032, Aug. 2016, 12 pages.

Khishvand, et al., In situ characterization of wettability alteration and displacement mechanisms governing recovery enhancement due to low-salinity waterflooding. Water Resources Research 53, May 31, 2017, 17 pages.

Khishvand, et al., In-situ Characterization of Wettability and Pore-scale Displacements during Two- and Three-phase flow in Natural Porous Media, Department of Petroleum Engineering, 2016, 52 pages.

Khishvand, et al., Micro-scale experimental investigation of the effect of flow rate on trapping in sandstone and carbonate rock samples. Advances in Water Resources 94, May 20, 2016, 21 pages.

Klise et. al., Automated contact angle estimation for three-dimensional x-ray microtomography data, https://www.scienedirect.com/science/article/pii/S0309178150026551, 2015, 14 pages.

Kohanpur, et al., Pore-Network Stitching Method: A Pore-to-Core Upscaling Approach for Multiphase Flow. Transport in Porous Media, Oct. 27, 2020, 28 pages.

Kuang, et al., Pore-Scale Sweep Efficiency Enhancement by Silica-Based Nanofluids in Oil-Wet Sandstone, Energy Fuels 2020, 12 pages.

Lago et al, Threshold pressure in capillaries with polygonal cross section, Journal of colloid and interface science 243, 2001, 8 pages.

Lanetc et al, Coupling of transient matrix diffusion and pore network models for gas flow in coal, Journal of Natural Gas Science and Engineering 88, 2021, 12 pages.

Laubach et. al., Are open fractures necessarily aligned with maximum horizontal stress, Earth and Planetary Science Letters 222, Feb. 17, 2004, 5 pages.

Ledig, et al., Photo-realistic single image super-resolution using a generative adversarial network., IEEE Conference on Computer Vision and Pattern Recognition, May 25, 2017, 19 pages .

Lemonnier et al, Simulation of naturally fractured reservoirs. State of the art-part 1—physicalformulation, Oil & Gas Science and Technology—Rev. IFP vol. 65, 2010, 24 pages.

Adler, Transports in fractal porous media, Journal of Hydrology, 187 (1996), 19 pages.

Aghaei, et al., Direct pore-to-core up-scaling of displacement processes: Dynamic pore network modeling and experimentation, Journal of Hydrology 522 2015, 22 pages.

Akai et. al., Quantification of uncertainty and best practice in computing interfacial curvature from complex pore space images, Dept of Earth Sci. & Eng, Jul. 3, 2019, 21 pages.

Aker, et al., A Two-Dimensional Network Simulator for Two-Phase Flow in Porous Media, Transport in Porous Media 32, 1998, pp. 163-186.

Al-Gharbi, et al., Dynamic network modeling of two-phase drainage in porous media. Phys. Rev. E 71, 16308, Jan. 13, 2005, 16 pages.

Alhammadi et. al., Pore-scale x-ray imaging with measurement of relative permeability, capillary pressure and oil recovery in a mixed-wet micro-porous carbonate reservoir rock, Fuel 268, Feb. 29, 2020, 14 pages.

Alizadeh, et al., The effect of saturation history on three-phaserelative permeability: An experimental study, Department of Chemical and Petroleum Eng, University of Wyoming, Jan. 31, 2014, 29 pages.

Al-Raoush et al., Extraction of physically realistic pore network properties from three-dimensional synchrotron x-ray microtomography images of unconsolidated porous media systems, Journal of Hydrology, 300, 2005, 173 pages.

AlRatrout et. al., Automatic measurement of contact angle in pore-space images, Advances in Water Resources 109, 2017, 12 pages.

Álvaro González, Measurement of areas on a sphere using fibonacci and latitude-longitude lattices. Mathematical Geosciences, 42, 28, Nov. 2009, 17 pages.

An, et al., Transition From Viscous Fingering to Capillary Fingering: Application of GPU-Based Fully Implicit Dynamic Pore Network Modeling, Water Resources Research 56, Oct. 22, 2020, 18 pages.

Anbari et al., Estimation of capillary pressure in unconventional reservoirs using thermodynamic analysis of pore images. JGR: Solid Earth, Nov. 7, 2019, 23 pages.

Anderson, W. G. Wettability Literature Survey—Part 6: The Effects of Wettability on Waterflooding, Journal of Petroleum Technology, Dec. 1987, 18 pages.

Anderson, Wettability Literature Survey—Part 2: Wettability Measurement, Journal of Petroleum Technology, Nov. 1986, 17 pages.

Anderson, Wettability Literature Survey Part 5: The Effects of Wettability on Relative Permeability, Journal of Petroleum Technology, Nov. 1987, 16 pages.

Andrã et al., Digital rock physics benchmarks-part i: Imaging and segmentation, Computers & Geosciences, 50, Sep. 18, 2012, 8 pages.

Andrew, et al., Pore-scale contact angle measurements at reservoir conditions using X-ray microtomography, Advances in Water Resources 68, 2014, 8 pages.

Armstrong, et al., Linking pore-scale interfacial curvature to col. scale capillary pressure, Advances in Water Resources 46, 2012, 8 pages.

Arshadi et. al., Pore-Scale Experimental Investigation of Two-Phase Flow Through Fractured Porous Media, Advancing Earth and Space Science, May 20, 2018, 30 pages.

Ayodele, Theoretical analysis of viscous coupling in two-phase flow through porous media, Transport in Porous Media, 2006, 14 pages.

Bakhshian, et al., Pore-scale characteristics of multiphase flow in heterogeneous porous media using the lattice Boltzmann method, Scientific Reports 9 Mar. 4, 2019, 14 pages.

Balay et al, PETSc Users Manual, Technical Report ANL-95/11 Revision 3.11, Argonne National Laboratory, 2019, 268 pages.

Bear, Modeling Flow and Contaminant Transport in Fractured Rocks, Technion-Israel Institute of Technology, 1993, 37 pages.

Berg et. al., Real-time 3D imaging of Haines jumps in porous media flow, Harvard University, Jan. 17, 2023, 5 pages.

Bertels et. al., Measurement of aperture distribution, capillary pressure, relative permeability, and in situ saturation in a rock fracture using computed tomography scanning, Water Resources Research, vol. 37, No. 3, Mar. 2001, 14 pages.

Bhattad et al, Effect of network structure on characterization and flow modeling using x-ray micro-tomography images of granular and fibrous porous media, Transport in Porous Media 90, 2011, 30 pages.

Blunt et. al., A thermodynamically consistent characterization of wettability in porous media using high-resolution imaging, Journal of Colloid and Interface Science 552, 2019, 7 pages.

Blunt, Effects of heterogeneity and wetting on relative permeability using pore level modeling, SPE Journal, vol. 2, Mar. 1997, 18 pages.

Blunt, et al., Pore-scale imaging and modelling, Advances in Water Resources, 51, 2013, https://doi.org/10.1016/j.advwatres.2012.03.003, 20 pages.

Blunt, Physically-based network modeling of multiphase flow in intermediate-wet porous media. Journal of Petroleum Science and Engineering 20, Jan. 21, 1998, 9 pages.

Blunt, et al., Detailed physics, predictive capabilities and macroscopic consequences for pore-network models of multiphase flow, Advances in Water Resources, 25 (2002), 21 pages.

Brown, Fluid flow through rock joints: The effect of surface roughness, Journal of Geophysical Research, vol. 92, No. B2, Feb. 10, 1987, 11 pages.

Brown, Simple mathematical model of a rough fracture, Journal of Geophysical Research, vol. 100, No. B4, Apr. 10, 1995, 12 pages.

Brush et al., Fluid flow in synthetic rough-walled fractures: Navier-stokes, stokes, and local cubic law simulations, Water Resources Research, vol. 39, No. 4, 1085, Apr. 3, 2023, 15 pages.

Bryant, et al., Prediction of relative permeability in simple porous media, Phys. Rev. A, vol. 46, No. 4, Aug. 15, 1992, 8 pages.

(56) References Cited

OTHER PUBLICATIONS

Bultreys et al, Validation of model predictions of pore-scale fluid distributions during two-phase flow, Phys. Rev. E, 97, May 14, 2018, 14 pages.

Chen, Liquid-gas relative permeabilities in fractures: Effects of flow structures, phase transformation and surface roughness, Dissertation, Jun. 2005, 222 pages.

Corey, et. al., Three-Phase Relative Permeability, Gulf Research & Development Co., Nov. 1956, 3 pages.

Culligan et. al., Interfacial area measurements for unsaturated flow through a porous medium, Water Resources Research, vol. 40, W12413, Dec. 22, 2004, 12 pages.

Culligan et. al., Pore-scale characteristics of multiphase flow in porous media: A comparison of air-water and oil-water experiments, Advances in Water Resources 29, 2006, 12 pages.

David et. al., Investigation of the Neumann triangle for dodecane liquid lenses on waters, Colloids and Surfaces A: Physicochemical and Engineering Aspects, 333, 2009, 7 pages.

Desbrun et. al., Implicit fairing of irregular meshes using diffusion and curvature flow, SIGGRAPH 99, 1999, 8 pages.

Detwiler et. al., Interphase mass transfer in variable aperture fractures: Controlling parameters and proposed constitutive relationships, Water Resources Research, vol. 45, Aug. 27, 2009, 21 pages.

Diomampo, Relative permeability through fractures, SGP-TR-170, Aug. 2001, 74 pages.

Dong, et al., Pore-network extraction from micro-computerized-tomography images, Phys. Rev. E 80, 036307, Sep. 14, 2009, 11 pages.

Dong, Micro-CT Imaging and Pore Network Extraction, Dissertation to Dept. of Earth Science and Engineering of Imperial College London, 2007, 30 pages.

Ehrlich, Viscous Coupling in Two-Phase Flow in Porous Media and Its Effect on Realtive Permeabilities, Transport in Porous Media, 11, 1993, 18 pages.

Fatt, The Network Model of Porous Media. AIME Petroleum Transactions, 1956, 38 pages.

Fei, Avizo Reference Guide, Avizo Software for Materials Research, ThermoFisher, 12 pages.

Ferer et. al., Two-phase flow in a rough fracture: Experiment and modeling, Physical Review E84, Jul. 28, 2011, 8 pages.

Leverett, et al., Capillary Behavior in Porous Solids, manuscript, Oct. 1940, 18 pages.

Li et al., An improved method for estimating capillary pressure from 3d microtomography images and its application to the study of disconnected nonwetting phase, Science Direct, 2018, 33 pages.

Lian et. al., The characteristics of relative permeability curves in naturally fractured carbonate reservoirs, Journal of Canadian Petroleum Technology, Mar. 2012, 6 pages.

Liang, et al., Geometric and topological analysis of three-dimensional porous media: Pore space partitioning based on morphological skeletonization, Journal of Colloid and Interface Science, 221, 2000, 12 pages.

Lim et al., Enhanced deep residual networks for single image super-resolution, In Proceedings of the IEEE conference on computer vision and pattern recognition workshops, Jul. 10, 2017, 9 pages.

Lin et al., Imaging and measurement of pore-scale interfacial curvature to determine capillary pressure simultaneously with relative permeability, Water Resources Research 54, Sep. 8, 2018, 15 pages.

Lin et. al., Minimal surfaces in porous media: Pore-scale imaging of multiphase flow in an altered-wettability Bentheimer sandstone, Physical Review E 99, Jun. 10, 2019, 13 pages.

Lindquist et al., Investigating 3D geometry of porous media from high resolution images, Physics and Chemistry of the Earth, MS No. SE39.2012, 1998, 8 pages.

Lindquist, et al., Medial Axis Analysis of Three Dimensional Tomographic Images of Drill Core Samples, Jan. 27, 1995, 19 pages.

Lindquist, The geometry of primary drainage, Journal of colloid and interface science 296, Nov. 16, 2005, 14 pages.

López, Constant mean curvature surfaces with boundary, Springer Monographs in Mathematics, 2013, 296 pages.

Lorensen et al., Marching cubes: A high resolution 3d surface construction algorithm, Computer Graphics, vol. 21, No. 4, Jul. 1987, 8 pages.

Lv et. al., In situ local contact angle measurement in a $CO_2$-brine-sand system using microfocused x-ray CT, Research Gate, Jan. 19, 2018, 10 pages.

Heshmati et al, Experimental investigation of dynamic contact angle and capillary rise in tubes with circular and noncircular cross sections, Langmuir, Oct. 16, 2014, 12 pages.

Ma, et al., Effect of contact angle on drainage and imbibition in regular polygonal tubes, Colloids and Surfaces A: Physicochemical and Engineering Aspects 117, 1996, 19 pages.

Maini et. al., A comparison of steady-state and unsteady-state relative permeabilities of viscosities oil and water in Ottawa sand, The Journal of Canadian Petroleum Technology, Mar.-Apr. 1990, 7 pages.

March et. al., Assessment of $CO_2$ storage potential in naturally fractured reservoirs with dual-porosity models, Water Resources Research 54, Mar. 8, 2018, 20 pages.

Mascini, et al., Event-based contact angle measurements inside porous media using time-resolved micro-computed tomography, Journal of Colloid and Interface Science 572, 2020, 10 pages.

Mason et al., Capillary behavior of a perfectly wetting liquid in irregular triangular tubes, Journal of Colloid and Interface Science, vol. 141, No. 1, Jan. 1991, 13 pages.

Masson, A fast two-step algorithm for invasion percolation with trapping, Computers & Geosciences 90, Feb. 3, 2016, 9 pages.

Mayer et al., Mercury porosimetry—breakthrough pressure for penetration between packed spheres, Journal of Colloid Science 20, Mar. 4, 1965, 19 pages.

Miao et al., A new way to parameterize hydraulic conductances of pore elements: A step towards creating pore- networks without pore shape simplifications, Advances in water resources 105, Apr. 26, 2017, 11 pages.

Mirani et. al., Production-pressure-drawdown management for fractured horizontal wells in shale-gas formations, SPE Reservoir Evaluation & Engineering, Aug. 2018, 16 pages.

Mohamed, et al., A pore-scale experimental investigation of process-dependent capillary desaturation, Advances in Water Resources 114, 2020, 13 pages.

Neuweiler et. al., Experimental and theoretical investigations of drainage in horizontal rough-walled fractures with different correlation structures, Advances in Water Resources 27, Jul. 14, 2004, 15 pages.

Nguyen et. al., Effectiveness of supercritical-$CO_2$ and N2 huff-and-puff methods of enhanced oil recovery in shale fracture networks using microfluidic experiments, Science Direct, 2018, 39 pages.

Oak, Three-Phase Relative Permeability of Water-Wet Berea, SPE/DOE 20183, Apr. 25, 1990, 12 pages.

Ogilvie et. al., Fluid flow through rough fractures in rocks. II: A new matching model for rough rock fractures, Earth and Planetary Science Letters 241, Jan. 4, 2006, 12 pages.

Øren et al, Extending predictive capabilities to network models, SPE journal 3, Jun. 15, 1996, 18 pages.

Øren et al, Reconstruction of Berea sandstone and pore-scale modelling of wettability effects, J Pet Sci Eng, vol. 39, No. 3-4, Jan. 24, 2003, 24 pages.

Ovaysi et al., Multi-GPU acceleration of direct pore-scale modeling of fluid flow in natural porous media, Computer Physics Communications, Apr. 25, 2012, 9 pages.

Ovaysi et al., Pore-scale dissolution of CO2+SO2 in deep saline aquifers, International Journal of Greenhouse Gas Control, Mar. 18, 2013, 15 pages.

Ovaysi et al., Pore-space alteration induced by brine acidification in subsurface geologic formations, Water Resources Research, vol. 50, 440-452, Jan. 17, 2014.

Ovaysi, et al., Direct pore-level modeling of incompressible fluid flow in porous media, Journal of Computational Physics, Jun. 23, 2010, 21 pages.

(56) References Cited

OTHER PUBLICATIONS

Ovaysi, et al., Pore-scale modeling of dispersion in disordered porous media, Journal of Contaminant Hydrology, Feb. 15, 2011, 14 pages.

Patzek, Verification of a Complete Pore Network Simulator of Drainage and Imbibition, SPE J. 6, Jan. 10, 2001, 13 pages.

Persoff et al, Two-phase flow visualization and relative permeability measurement in natural rough-walled rock fractures, Water Resources Research vol. 31, May 1995, 12 pages.

Petchsingto, Numerical study of fracture aperture characteristics and their impact on single-phase flow and capillary-dominated displacement, The Pennsylvania State University College of Earth and Mineral Sciences, May 2008, 153 pages.

Piri et al, Prediction of fluid occupancy in fractures using network modeling and x-ray microtomography. II: Results, Physical Review E 76, 2007, 11 pages.

Piri et al, Three-phase threshold capillary pressures in noncircular capillary tubes with different wettabilities including contact angle hysteresis, Physical Review E 70, Dec. 14, 2004, 17 pages.

Piri et al., "Three-dimensional mixed-wet random pore-scale network modeling of two- and three-phase flow in porous media. I. Model description", Physical Review E 71, 026301, 2005, 30 pages.

Piri, et al., Three-dimensional mixed-wet random pore-scale network modeling of two- and three-phase flow in porous media. II. Results, Physical Review E 71, 026301, Feb. 4, 2005, 11 pages.

Princen, Capillary Phenomena in Assemblies of Parallel Cylinders: I. Capillary Rise Between Two Cylinders, Journal of Colloid and Interface Science, 30, 1969, 7 pages.

Princen, Capillary Phenomena in Assemblies of Parallel Cylinders: II. Capillary Rise In Systems With More Than Two Cylinders. Journal of Colloid and Interface Science, 30, 1969, 13 pages.

Princen, Capillary Phenomena in Assemblies of Parallel Cylinders: III. Liquid Columns Between Horizontal Parallel Cylinders. Journal of Colloid and Interface Science, 34, 1970, 14 pages.

Prodanovic et al., A level set method for determining critical curvatures for drainage and imbibition, Elsevier, Journal of Colloid and Interface Science 304, Aug. 23, 2006, 17 pages.

Prodanovic et al., Porous structure and fluid partitioning in polyethylene cores from 3D x-ray microtomographic imaging, Journal of Colloid and Interface Science, 298 (2006), 16 pages.

Prodanovic, et al., 3d image-based characterization of fluid displacement in a berea core. Advances in Water Resources, 30, 2007, 13 pages.

Prodanovic, et al., Imaged-based multiscale network modelling of microporosity in carbonates, Geological Society, 406 (2015), 19 pages.

Pruess, et al., On two-phase relative permeability and capillary pressure of rough-walled rock fractures, Earth Sciences Division, Sep. 1989, 44 pages.

Xie, et al., Impact of connate brine chemistry on in situ wettability and oil recovery: Pore-scale experimental investigation, Energy &fuels, 2020, 15 pages.

Xiong, et al., Review of pore network modelling of porous media: Experimental characterisations, network constructions and applications to reactive transport. Journal of Contaminant Hydrology 192, Jul. 12, 2016, 17 pages.

Yan et. al., Foam sweep in fractures for enhanced oil recovery, Colloids and Surfaces A: Physicochem Eng. Aspects, Feb. 24, 2006, 12 pages.

Yang et al, An automatic in situ contact angle determination based on level set method, Water Resources Research, May 29, 2020, 14 pages.

Yang et. al., A generalized approach for estimation of in-plane curvature in invasion percolation models for drainage in fractures, Water Resources Research, vol. 48, Sep. 6, 2012, 12 pages.

Yang et. al., Effect of aperture field anisotropy on two-phase flow in rough fractures, Advances in Water Resources 132, 2019, 11 pages.

Yang et. al., Modeling immiscible two-phase flow in rough fractures from capillary to viscous fingering, Water Resources Research, 2019, 24 pages.

Ye et. al., Two-phase flow properties of a horizontal fracture: The effect of aperture distribution, Advances in Water Resources 76, 2015, 12 pages.

Yeo et. al., Effect of shear displacement on the aperture and permeability of a rock fracture, Int. J. Rock Mech. Min. Sci. vol. 35, 1998, 20 pages.

Yi, et al., Pore network extraction from pore space images of various porous media systems, Water Resources Research, Apr. 26, 2017, 22 pages.

Young, III. An essay on the cohesion of fluids, https://royalsocietypublishing.org, Dec. 20, 1804, 23 pages.

Zankoor et al., In-Situ Capillary Pressure and Wettability in Natural Porous Media: Multi-Scale Experimentation and Automated Characterization Using X-Ray Images, Journal of Colloid and Interface Science 603, Jun. 15, 2021, 14 pages.

Zankoor et. al., Supplementary Information: In-Situ Capillary Pressure and Wettability in Natural Porous Media: Multi-Scale Experimentation and Automated Characterization Using X-Ray Images, Journal of Colloid and Interface Science 603, Jun. 15, 2021, 14 pages.

Zhao, et al., Comprehensive comparison of pore-scale models for multiphase flow in porous media, Proceedings of the National Academy of Sciences vol. 116, No. 28, Jun. 21, 2019, 8 pages.

Zhao, et al., Simulation of Quasi-Static Drainage Displacement in Porous Media on Pore-Scale: Coupling Lattice Boltzmann Method and Pore Network Model. Journal of Hydrology 588, May 23, 2020, 16 pages.

Zhao, et al., The Effect of Wettability Heterogeneity on Relative Permeability of Twophase Flow in Porous Media: A Lattice Boltzmann Study. Water Resources Research 54, Feb. 27, 2018, 17 pages.

Zhou, et al., Computation of three-phase capillary entry pressures and arc menisci configurations in pore geometries from 2d rock images: a combinatorial approach. Advances in Water Resources 69, Apr. 2, 2014, 16 pages.

Zhou, et al., Dynamic capillary pressure curves from pore-scale modeling in mixed-wet-rock images. SPE Journal Aug. 2013, 12 pages.

Zhou, et al., On The Estimation of CO2 Capillary Entry Pressure: Implications on Geological CO2 Storage. International Journal of Greenhouse Gas Control, 20 pages.

Zhu, et al., Limits of the Hydrodynamic No-Slip Boundary Condition. Physical Review Letters, vol. 88, No. 10, Mar. 11, 2002, 4 pages.

Zolfaghari et al., Pore-Scale Network Modeling of Three-Phase Flow Based on Thermodynamically Consistent Threshold Capillary Pressures. I. Cusp Formation and Collapse, Transport in Porous Media, 2017, 46 pages.

Zolfaghari, et al., Pore-scale Network Modeling of Three-Phase Flow Based on Thermodynamically Consistent Threshold Capillary Pressures. I. Cusp Formation and Collapse Transport in Porous Media, Jan. 21, 2017, 46 pages.

Zolfaghari, et al., Pore-scale Network Modeling of Three-Phase Flow Based on Thermodynamically Consistent Threshold Capillary Pressures. II. Results Transport in Porous Media 116:1139-1165, Jan. 21, 2017, 27 pages.

Schroeder, et al., The Visualization Toolkit, an Object-Oriented Approach to 3D Graphics, Edition 4.1, VTK, Jul. 2018, 558 pages.

PCT/US2023/31400, International Search Report and Written Opinion dated Jan. 31, 2024, 26 pages.

PCT/US2023/31329, International Search Report and Written Opinion dated Nov. 21, 2023, 13 pages.

PCT/US2023/31338, International Search Report and Written Opinion dated Mar. 18, 2024, 22 pages.

PCT/US2024/26432, International Search Report and Written Opinion dated Aug. 22, 2024, 17 pages.

PCT/US2024/44240, International Search Report and Written Opinion dated Nov. 4, 2024, 17 pages.

Brooks et al., Hydraulic Properties of Porous Media, Hydrology Papers, Mar. 1964, 37 pages.

Purcell, Capillary Pressures—Their Measurement Using Mercury and the Calculation of Permeability Therefrom, Shell Oil Company, Petroleum Transactions, AIME, Feb. 1949, 10 pages.

(56)            References Cited

OTHER PUBLICATIONS

Hazlett, Simulation of capillary-dominated displacements in microtomographic images of reservoir rocks, Transport in Porous Media, 20:21-35, Aug. 1995, 15 pages.

Elrich, Viscous coupling in two-phase flow in porous media and its effect on relative permeabilities, Transport in Porous Media 11, Apr. 9, 1992, 18 pages.

Rabbani et al, Hybrid pore-network and lattice-boltzmann permeability modelling accelerated by machine learning, Advances in water resources 126, Feb. 26, 2019, 13 pages.

Rabbani, et al., An automated simple algorithm for realistic pore network extraction from micro-tomography images, J Pet Sci Eng, vol. 123, Aug. 12, 2014, 8 pages.

Raeesi et al., Capillary pressure hysteresis behavior of three sandstones measured with a multistep outflow-inflow apparatus, Vadose Zone Journal 13, Jun. 1, 2013, 12 pages.

Raeesi et al., The effects of wettability and trapping on relationships between interfacial area, capillary pressure and saturation in porous media: A pore-scale network modeling approach, Journal of Hydrology 376, 2009, 16 pages.

Raeesi, et al., Effect of surface roughness on wettability and displacement curvature in tubes of uniform cross-section. Colloids and Surfaces A: Physicochemical and Engineering Aspects 436, 2013, 10 pages.

Raeini, et al., Generalized network modeling: Network extraction as a coarse-scale discretization of the void space of porous media, Phys. Rev. E, 96 (2017), 17 pages.

Raeini, et al., Modelling two-phase flow in porous media at the pore scale using the vol. of-fluid method. Journal of Computational Physics 231, 2012, 16 pages.

Rücker et. al., Relationship between wetting and capillary pressure in a crude oil/brine/rock system: From nano-scale to core-scale, Journal of Colloid and Interface Science 562, Nov. 21, 2019, 11 pages.

Rusinkiewicz, Estimating curvatures and their derivatives on triangle meshes, Princeton University, 8 pages.

Ruspini, et al., Multiscale digital rock analysis for complex rocks. Transport in Porous Media, 139(2), Aug. 26, 2021, 26 pages.

Sabti, et al., In-situ investigation of the impact of spreading on matrix-fracture interactions during three-phase flow in fractured porous media. Advances in Water Resources 131, 2019, 15 pages.

Saraji, et al., Wettability of Supercritica lCarbon Dioxide/Water/ Quartz Systems: Simultaneous measurement of Contact Angle and Interfacial Tension at Reservoir Conditions, Langmuir ACS Publications, Apr. 29, 2013, 11 pages.

Scanziani et. al., Automatic method for estimation of in situ effective contact angle from x-ray micro tomography images of two-phase flow in porous media, Journal of Colloid and Interface Science 496, 2017, 9 pages.

Sedghi, et al., Atomistic Molecular Dynamics Simulations of Crude Oil/Brine Displacement in Calcite Mesopores, Langmuir, ACS Publications, Mar. 24, 2016, 10 pages.

Sedghi, et al., Molecular dynamics of wetting layer formation and forced water invasion in angular nanopores with mixed wettability, The Journal of Chemical Physics, Nov. 19, 2014, 13 pages.

Sendner et al, Interfacial Water at Hydrophobic and Hydrophilic Surfaces: Slip, Viscosity, and Diffusion. Langmuir 25, 10768-10781, Jun. 11, 2009, 14 pages.

Shabat et al., Design of porous micro-structures using curvature analysis for additive-manufacturing, Eslevier, Procedia CIRP 36, 2015, 6 pages.

Sheng, et al., A unified pore-network algorithm for dynamic two-phase flow, Advances in Water Resources 95, 2016, 17 pages.

Shi et al, Relative permeability of two-phase flow in three-dimensional porous media using the lattice Boltzmann method, International Journal of Heat and Fluid Flow 73, Aug. 4, 2018, 13 pages.

Silin et al, Pore space morphology analysis using maximal inscribed spheres, Physica A, May 16, 2006, 25 pages.

Singh et al, Dynamic modeling of drainage through three-dimensional porous materials, Chemical Engineering Science 58, Apr. 2003, 18 pages.

Siqveland et al, Derivations of the young-laplace equation, Capillarity vol. 4 No. 2, 2021, 8 pages.

Spanne et al, Synchrotron computed microtomography of porous media: topology and transports, Physical Review Letters, Oct. 3, 1994, 16 pages.

Suicmez, et al., Effects of wettability and pore-level displacement on hydrocarbon trapping, Advances in Water Resources, Nov. 19, 2007, 10 pages.

Suicmez, et al., Pore-scale Simulation of Water Alternate Gas Injection, Transport in Porous Media 66:259-286, Springer, 31, Jan. 2006, 28 pages.

Lee et al, Building skeleton models via 3-d medial surface axis thinning algorithms, CVGIP: Graphical Models and Image Processing, 56, Nov. 1994, 17 pages.

Tan et al. Equation-of-State Modeling of Associating-Fluid Phase Equilibria in Nanopores, Fluid Phase Equilibria 405, 2015, 10 pages.

Tan et al., Equation-of-State Modeling of Confined-Fluid Phase Equilibria in Nanopores, Fluid Phase Equilibria 393, 2015, 16 pages.

Thompson, Pore-scale modeling of fluid transport in disordered fibrous materials, AIChE Journal, Jul. 2002, vol. 48, No. 7, 21 pages.

Tokunaga et al, Water film flow along fracture surfaces of porous rock, Water Resources Research vol. 33 No. 6, Jun. 1997, 9 pages.

Tokunaga et. al., Transient film flow on rough fracture surfaces, Water Resources Research vol. 36 No. 7, Jun. 2000, 10 pages.

Tørå et al., A Dynamic Network Model for Two-Phase Flow in Porous Media. Transp Porous Med 92, 2012, 21 pages.

Tsang, et. al., Hydrologic issues associated with nuclear waste repositories, Water Resources Research 51, 2015, 50 pages.

Valvatne, et al., Predictive pore-scale modeling of two-phase flow in mixed wet media. Water Resources Research 40, 2004, 21 pages.

Van Genuchten, A closed-form equation for predicting the hydraulic conductivity of unsaturated soils, Soil Sci. Soc. Am. J. vol. 44, 1980, 7 pages.

Van Gorp et al, Bottom-up design of porous electrode by combining a genetic algorithm and a pore network model, Chemical Engineering Journal 455, 2023 13 pages.

Virnovsky, et al., Modeling capillary pressure using capillary bundles with arbitrary cross-sections obtained from photomicrographs. Journal of Petroleum Science and Engineering 69, 2009, 12 pages.

Vouga, Lectures in Discrete Differential Geometry 3-Discrete Surfaces, Mar. 19, 2014, 6 pages.

Wang et al., Connecting pressure-saturation and relative permeability models to fracture properties: The case of capillary-dominated flow of supercritical CO2 and brine, Water Resources Research, Sep. 27, 2018, 18 pages.

Wang et. al., Experimental study of the nonlinear flow characteristics of fluid in 3d rough-walled fractures during shear process, Rock Mechanics and Rock Engineering, Feb. 25, 2020, 25 pages.

Wang, et al., A dynamic pore-scale network model for two-phase imbibition, Journal of Natural Gas Science and Engineering 26, 2015, 12 pages.

Wang, et al., Deep learning in pore scale imaging and modeling. Earth-Science Reviews, 215, 2021, 32 pages.

Wang, et al., Fast direct flow simulation in porous media by coupling with pore network and Laplace models. Advances in Water Resources 150, 103883, 2021, 13 pages.

Watanabe et. al., New v-type relative permeability curves for two-phase flows through subsurface fractures, Water Resources Research, Apr. 26, 2015, 18 pages.

Welch et al., Molecular Dynamics Simulations of Retrograde Condensation in Narrow Oil-Wet Nanopores, The Journal of Physical Chemistry, 2015, 8 pages.

Welch et al., Pore diameter effects on phase behavior of a gas condensate in graphitic one- and two-dimensional nanopores, J Mol Model, 2016, 9 pages.

(56)          References Cited

OTHER PUBLICATIONS

Wildenschild, et al., X-ray imaging and analysis techniques for quantifying pore-scale structure and processes in subsurface porous medium systems, Advanced Water Resources, vol. 51, Jan. 2013, 75 pages.

\* cited by examiner

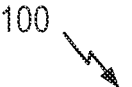
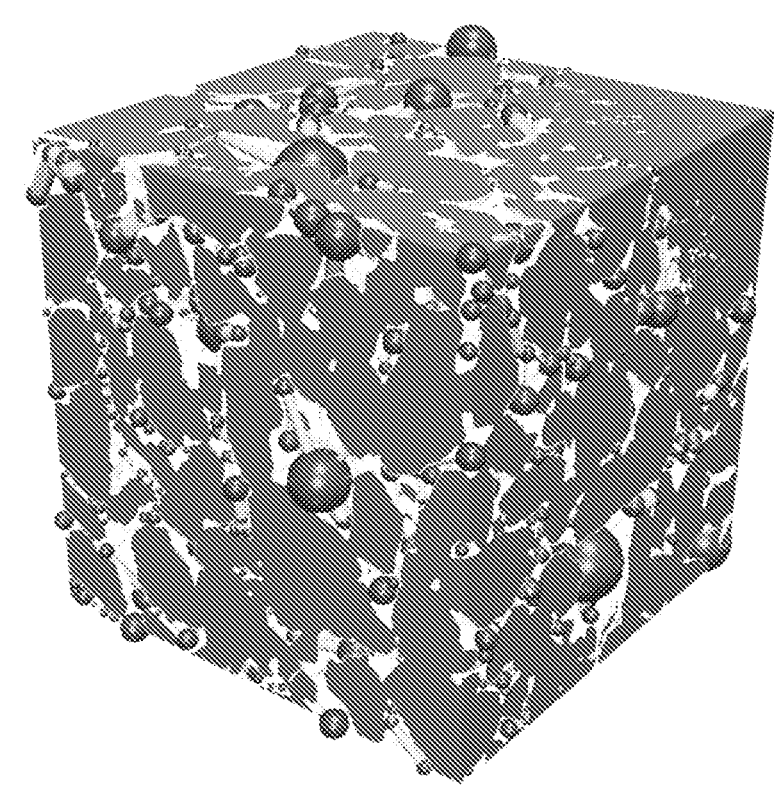
FIG. 1A
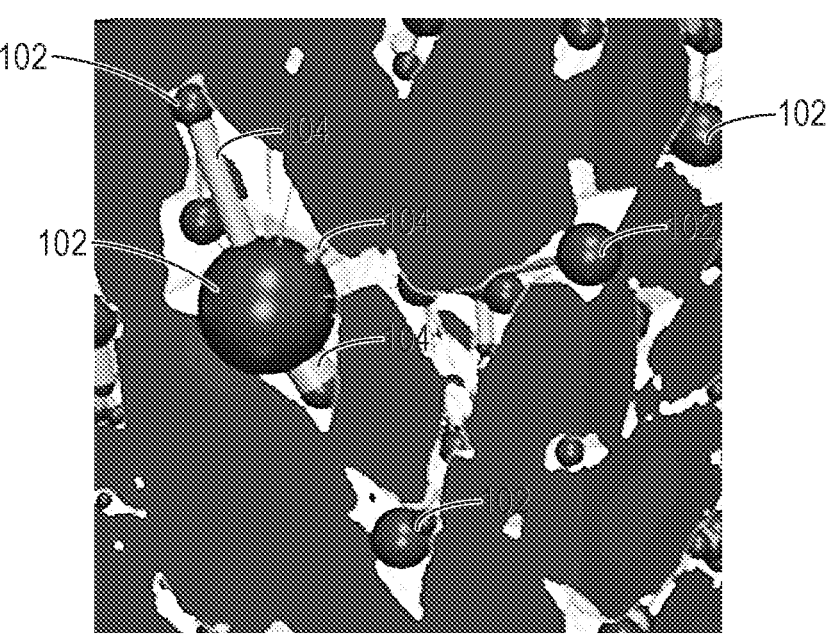
FIG. 1B

300

X-ray micro-CT
images 302

↓

Image processing
304

↓

3D segmented
images 306

Extract FFIs
308 ──────────────────→ Extract TCLs
                                    316

↓                                   ↓

Smooth FFIs                  Generate 2D
310                          slices
                             perpendicular to
                             TCLs 318

↓                                   ↓

Determine                    Process the 2D
surface curvature            slices 320
312

↓                                   ↓

Determine                    Determine
capillary pressure ──┐       contact angles
314                  │       322
                     │          │
                     └────┬─────┘
                          ↓
                  Data analysis and
                  visualization
                  324

800

1000

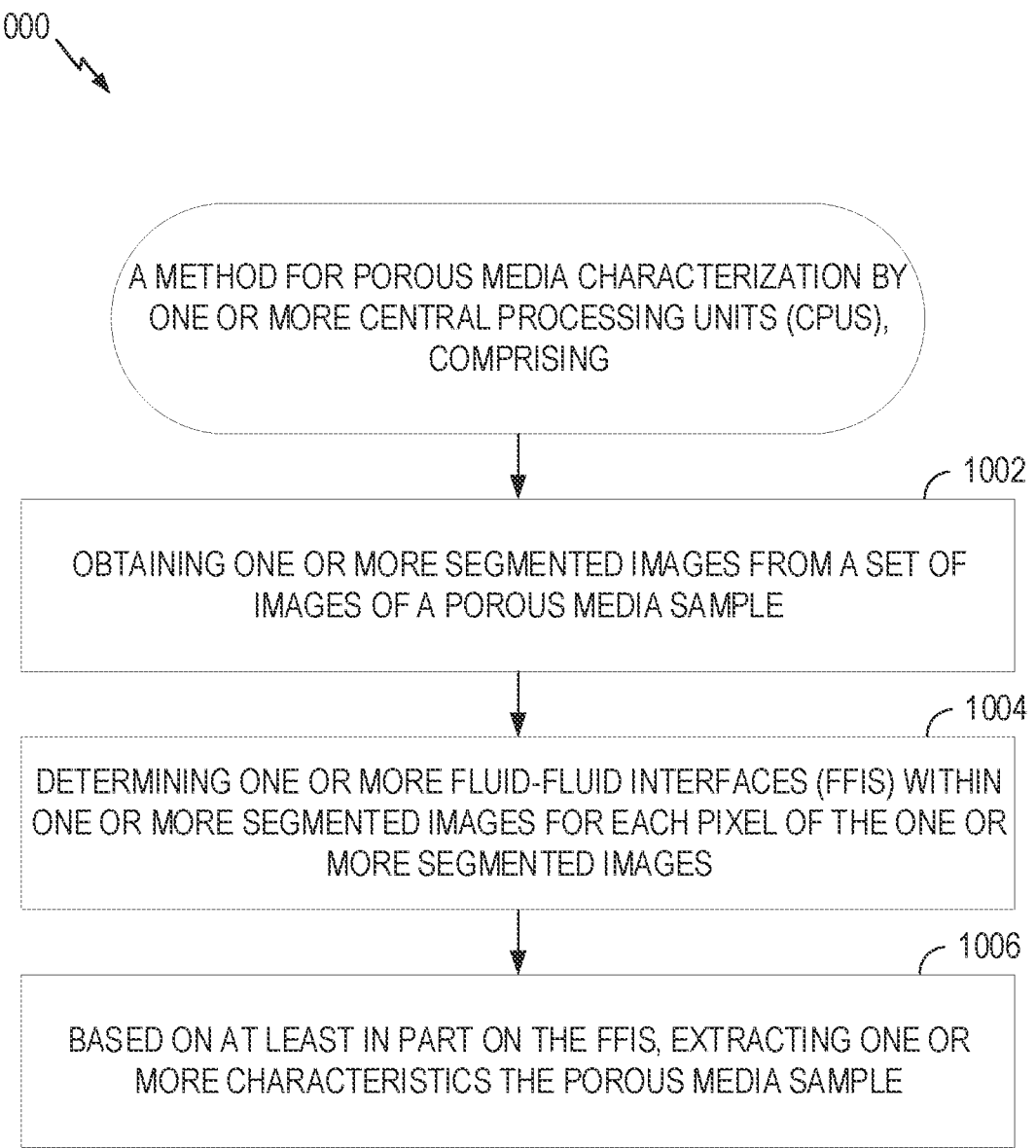

A METHOD FOR POROUS MEDIA CHARACTERIZATION BY ONE OR MORE CENTRAL PROCESSING UNITS (CPUS), COMPRISING

1002

OBTAINING ONE OR MORE SEGMENTED IMAGES FROM A SET OF IMAGES OF A POROUS MEDIA SAMPLE

1004

DETERMINING ONE OR MORE FLUID-FLUID INTERFACES (FFIS) WITHIN ONE OR MORE SEGMENTED IMAGES FOR EACH PIXEL OF THE ONE OR MORE SEGMENTED IMAGES

1006

BASED ON AT LEAST IN PART ON THE FFIS, EXTRACTING ONE OR MORE CHARACTERISTICS THE POROUS MEDIA SAMPLE

*FIG. 10*

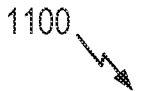
1100
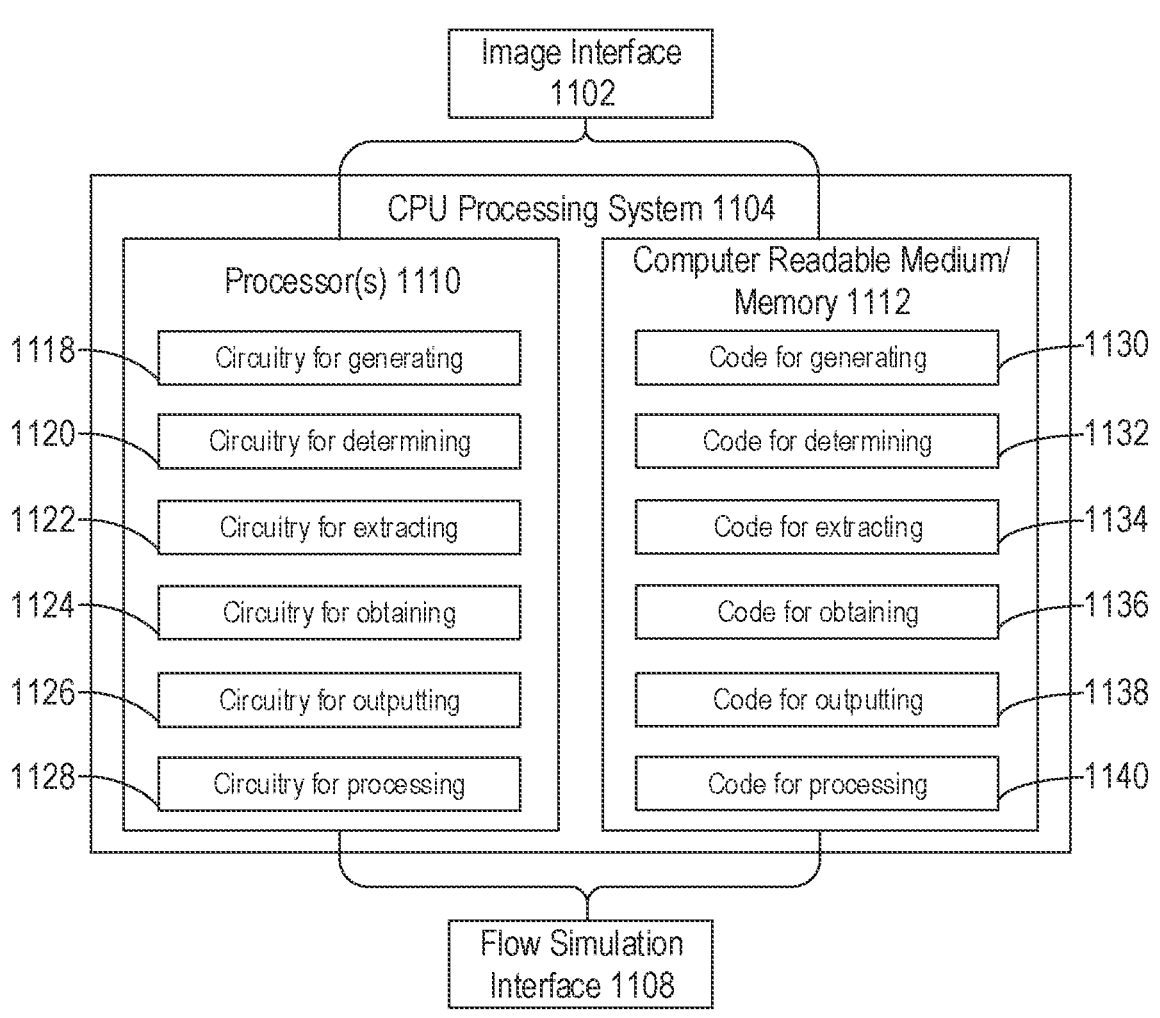
FIG. 11

METHOD AND SYSTEM FOR AUTOMATED IN-SITU CAPILLARY PRESSURE AND WETTABILTY CHARACTERIZATION OF POROUS MEDIA

CROSS-REFERENCE TO RELATED APPLICATIONS

This applications claims benefit of U.S. Provisional Patent Application No. 63/350,673, filed Jun. 9, 2022, the entirety of which is herein incorporated by reference.

BACKGROUND

Field

Aspects of the present disclosure generally relate to methods and systems for physical characterization of porous media, and more particularly, to techniques for extracting capillary pressure and wettability information for porous media samples.

Description of the Related Art

Modeling techniques for fluid flow through porous media are broadly implemented for petroleum resource development, materials engineering, food packaging, and medical technology development. Fluid flow modeling techniques may be equipped to illustrate both physical and chemical media properties like fluid saturation, permeability, capillary pressure, wettability, or other similar properties, which may be used to characterize fluid behavior within a porous media sample without requiring expensive destruction of the sample.

Although current techniques for modeling fluid flow through porous media are based on technological advancements made over many years, resultant models may still be tenuous representations of actual porous media. For example, fluid flow models of porous media may require low-resolution implementations to match currently available computational capabilities. As a result, fluid flow models based on porous media having microscale porosities may not accurately reflect physical and chemical properties of the media. Accordingly, there is an impetus to improve the accuracy of fluid flow modeling, including, for example: improving image processing techniques to allow for higher quality model input and model output, improving image processing techniques to enable more accurate model input and model output, improving in-situ characterization extraction techniques to better capture fluid behavior in microscale pore features, enhancing computational processing capability to reduce computational expense, enhancing computational processing capability to increase modeling speed, increasing automation for iterative modeling steps, improving model capability for dynamic modeling of different fluid flow environments, improving model capability for dynamic modeling of larger fluid flow environments, and the like.

Consequently, there exists a need for further improvements in fluid flow modeling of porous media to overcome the aforementioned technical challenges and other challenges not mentioned.

SUMMARY

One aspect of the present disclosure provides a method for porous media characterization by one or more central processing units (CPUs). The method includes obtaining one or more segmented images from a set of images of a porous media sample. The method includes determining one or more fluid-fluid interfaces (FFIs) within one or more segmented images for each pixel of the one or more segmented images. The method includes, based on at least in part on the FFIs, extracting one or more characteristics of the porous media sample.

One aspect of the present disclosure provides a method for porous media characterization by one or more CPUs. The method includes obtaining, from a scanning instrument, a set of images of a porous media sample, extracting one or more initial FFIs within one or more segmented images extracted from the set of images by generating a triangular mesh representative of the one or more initial FFIs, and generating one or more FFIs by smoothing the triangular mesh. The method may include determining surface curvature at each point of the triangular mesh. The method also includes, based on at least in part on the one or more FFIs or the surface curvature, extracting one or more characteristics of the porous media sample, wherein the one or more characteristics include capillary pressures and contact angles. The method further includes outputting the one or more characteristics of the porous media sample and data and visualization metrics corresponding to the one or more characteristics of the porous media sample.

Other aspects of the present disclosure provide: an apparatus operable, configured, or otherwise adapted to perform the aforementioned methods as well as those described elsewhere herein; a non-transitory, computer-readable media comprising computer-executable instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more message passing interfaces.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only example aspects and are therefore not to be considered limiting of its scope, may admit to other equally effective aspects.

FIG. 1A depicts an example pore network model extracted from a porous media sample made of sandstone.

FIG. 1B depicts an example set of high-resolution porous media image taken by a scanning instrument from a single rock sample and segmented for characterization.

FIG. 10 is a flow diagram illustrating certain operations by one or more CPUs, according to certain aspects of the present disclosure.

FIG. 11 is an example device for non-destructive characterization of porous media.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 2:
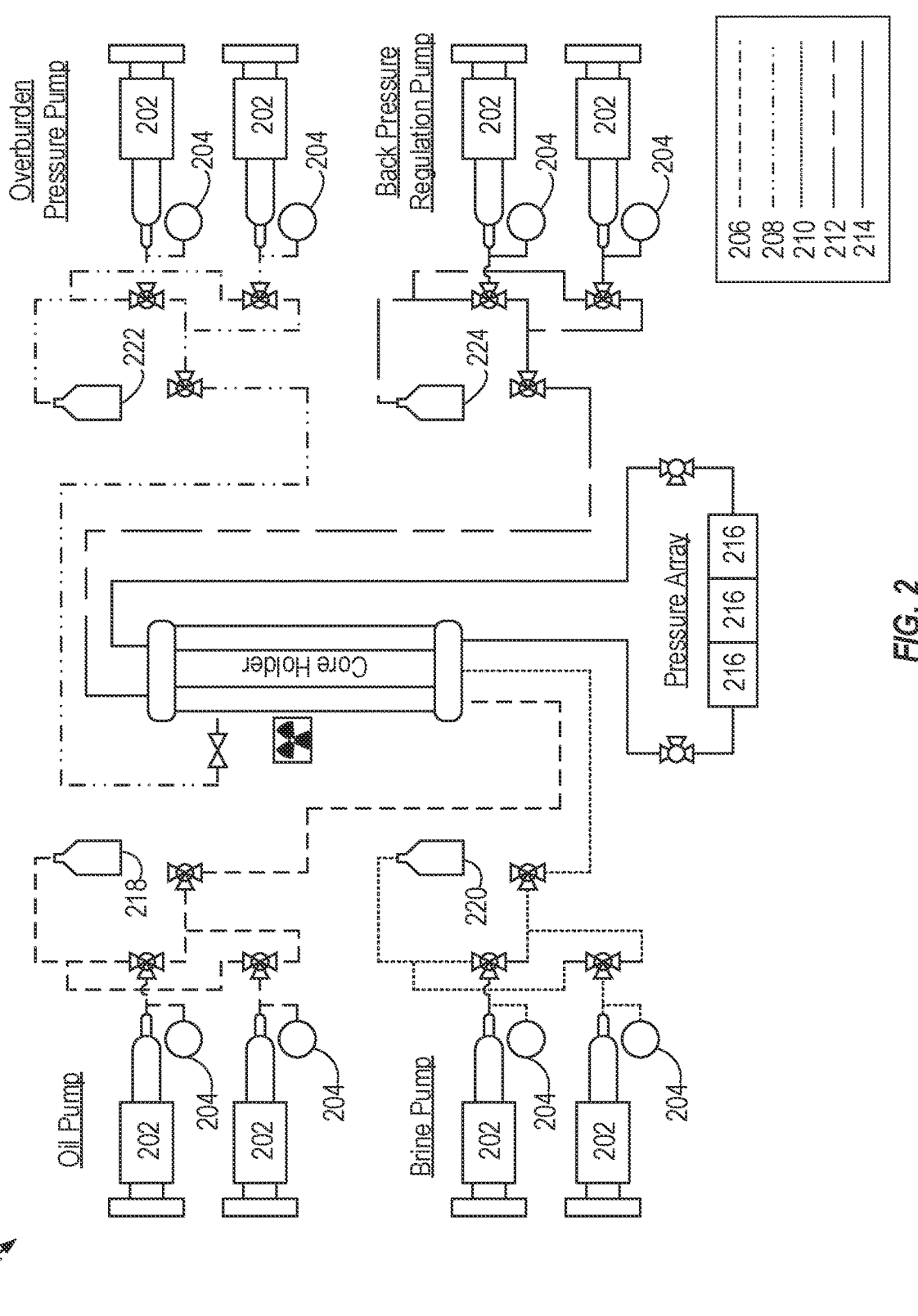
FIG. 2 depicts an example core-flooding instrument for determining the physical and chemical characteristics of a porous media sample.

In the following, reference is made to aspects of the disclosure. However, it should be understood that the disclosure is not limited to specifically described aspects. Instead, any combination of the following features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

The present disclosure relates to techniques for physical characterization of porous media. Specifically, the techniques discussed herein may be implemented for non-destructive extraction of capillary pressure and wettability information from porous media samples. The porous media sample may comprise a digital rock sample, a rock sample, a core sample, a plastic sample, a tissue sample, or any other organic or inorganic sample having pore space ascertainable through imaging techniques.

A thorough grasp of fluid flow through porous spaces of certain materials may be consequential to enhancing technical efficacy of fluid flow techniques in a wide range of industries. Models of fluid flow are useful to describe physical and chemical characteristic of a porous material and may help to highlight the material's optimal usage. Often, networks of pores within a material are extremely small, ranging from microscale to microscale in size. Techniques for characterizing these pore networks are hindered by the computational expense of modeling at a microscale. To alleviate computational burdens, pore network modelling techniques often use generalized characterization techniques at expense of model accuracy. Extrapolation errors caused by such imprecise characterization may result in mischaracterization of physical and chemical characteristics of the porous material. In many cases, these errors render such models impractical for regular use. Accordingly, ideal modeling of fluid flow through porous media would allow for rapid, accurate characterization of microscale pore spaces that may be performed without inhibitive computational expense.

According to certain aspects of the present disclosure, stable and precise characterization may be achieved through automated characterization techniques of in-situ fluid flow through a porous media sample, implemented on one or more processors operating in parallel. Specifically, techniques described herein enable a user to obtain capillary pressure and contact angle values for a porous media sample that sufficiently represent those values even for irregular and microscale geometries that may be present in a pore space. Automated in-situ characterization of capillary pressure and wettability enables more accurate pore-scale modeling of fluid flow in porous media.

Implementation of techniques for efficiently generating in-situ fluid flow information as described herein may enhance pore network modelling functionality by reducing porous material characterization errors to the benefit of all users seeking a more comprehensive understanding of any given porous material.

Introduction to Pore Network Modeling

Modeling techniques for fluid flow through porous media may illustrate both physical and chemical porous media properties. Models of porous media may be used to ascertain permeability, capillary pressure, fluid saturation, wettability, buoyancy, and the like to a greater degree of accuracy more comparable to physical flooding of a porous media sample. Additionally, physical and chemical properties determined using pore network modeling techniques may be used to characterize in-situ fluid behavior as it travels through the porous media under a wide variety of wettability and flooding conditions. These conditions are not typically accessible to users performing conventional physical flooding characterization techniques.

Permeability is the tendency of the porous media to allow liquids to flow through the porous media. Capillary pressure is the pressure difference existing across the interface separating two immiscible fluids. Fluid saturation is the measurement of fluid present in the pore spaces of the porous media. Contact angle is a measured angle between a fluid-fluid or a fluid-gas interface at a point where it meets a solid surface. Wettability is the ability of a liquid to maintain contact with a solid surface. Wettability may vary depending on wettability conditions and the type of wetting liquid present in the porous media sample. For example, a water-wet medium may show a lower wetting affinity to the oil phase than an oil-wet medium, where higher or lower wetting is determined with respect to a given phase. In certain cases, the correlation between wettability and viscosity ratio may not be straightforward, as there may be water or oil wet conditions with similar viscosities.

A modeled pore network is a practical description of a porous medium targeted for fluid flow modeling. FIG. 1A illustrates an example section of a pore network extracted from porous sandstone. The section of the pore network describes the porosities of various size and shape present in that portion of the sandstone, and may be used to model fluid flow through those porosities for various wettability conditions. Three-dimensional (3D) portions of a pore network model may more accurately characterize the porous media sample either alone or in combination with other 3D portions of the pore network model.

Pore network models (e.g., of FIG. 1A) may be extracted from images of a targeted porous medium and used to model multi-phase fluid flow using physically-based displacement mechanisms (PBDMs) across pores defined in a pore network. PBDMs may represent an estimated displacement of a modeled fluid in response to movement of another fluid or gas within the pore network. As immiscible phases react with one another throughout the pore network during fluid flooding, PBDMs are induced where, for example, capillary pressure across a meniscus exceeds the wettability constraints on either phase. Fluid saturation, contact angle, buoyancy, and the like may also affect PBDMs throughout a pore network. By utilizing a pore network model extracted from a porous media sample, a user is able to ascertain PBDMs through the porous media sample under a wide variety of wettability conditions in order to ultimately obtain, for example, useful permeabilities for a larger sample of the porous medium without degrading a porous media sample via repeated physical flooding.

To properly generate PBDMs at a pore scale for the targeted porous media, imaging may capture complex geometries of the targeted porous media at a resolution sufficiently high to retain acceptable accuracy. An example of these geometries is illustrated in FIG. 1B. Pores may be defined as a complex polyhedron having at least a center 102 and spherical and effective diameters. Connective throats 104 between pores may also be defined. In many cases, image resolution may be in micrometers to capture applicable pore detail. High-resolution pore models enable accurate rendering of the fluid flow characteristics described above as ascertained at each pore and for each PBDM.

PBDMs may occur upon flooding or draining of a pore network model, where aqueous phase injection or removal is iteratively simulated through the pore network. Aqueous flooding and aqueous draining may be implemented in various modeled wettability conditions, where certain fluids are present prior to the start of a simulation. Wettability conditions may include at least water-wet, oil-wet, or mixed-wet conditions. During aqueous flooding, injected water may displace immiscible fluid preexisting in the pore network model. During aqueous draining, injected immiscible fluid may displace water preexisting in the pore network model. In certain cases, flooding and draining may be fluid flooding and fluid draining. In some cases, the fluid is oil.

Flooding or draining of a pore network model may be simulated based in part on scanned images of physical flooding implemented by a flooding instrument 200 of FIG. 2. In some cases, a porous media may undergo a core-flooding experiment to establish an irreducible water saturation, a residual oil saturation, or both. Core-flooding is enabled by a set of pumps 202, rupture disks 204, pump lines 206-214, differential pressure transducers 216, and source buckets 218-222 working in tandem to flood a porous media sample loaded in a core holder. In some cases, a scanning instrument (e.g., a micro computed tomography (micro-CT) scanner) captures a dry reference image prior to flooding. Scanning occurs in a field of view defined within the core holder. The porous media sample may be flooded with brine from bucket 220 via the brine tubing line 206 and scanned again to ensure that the porous media sample is fully saturated. Once the brine flooding is complete, the absolute permeability of the porous media sample may be obtained. The oil flooding may be performed alongside additional brine flooding. Any fluid expelled as a result of overburden pressure (i.e., pressure that compacts pore space and reduces permeability) is transported via the confining fluid line 208 and collected in bucket 222. Any fluid expelled as a result of the flooding procedure is transported via the effluent fluid line 212 and collected in bucket 224. In many cases, core sample pressure may be iteratively adjusted during flooding. Pressure may be recorded by one or more differential pressure transducers 216 coupled to the core holder via a transducer line 214.

Scanned images obtained from flooding procedures performed by the flooding instrument 200 of FIG. 2 may be used to extract a pore map representative of the porous media sample prior to, during, or after flooding. The images may be processed to determine characteristics of fluid flow through the porous media sample. In many cases, the images may also be used to extract a representative pore network model.

Imaging of porous media is typically performed using micro-CT imaging. In many cases, commercial micro-CT scanners (e.g., Zeiss scanners) are available for imaging necessary to perform pore network modelling. Images of porous media taken by micro-CT scanners are at a sufficiently high resolution to create a microscale digital image of the porous media.

In the current state of the art, there exists a challenge of extracting porous media characteristics in a manner precise and repeatable to ensure the ultimate stability of future simulations. Currently, techniques for porous media characterization require lengthy step-wise processing known to incur undue computational expense and introduce instability to characterization of the porous media sample. As a result, users may not be able to rely on characterization output to simulate flow conditions in a useful way.

Aspects Related to In-Situ Characterization of Porous Media

Fluid flow modelling through porous media is often utilized to enhance petroleum resource development. In recent years, global demand for energy resources has mobilized development of unconventional petroleum reservoirs as targets for hydrocarbon extraction. The geological formations that comprise these newly developed hydrocarbon reservoirs are ultra-tight shale formations resistant to primary petroleum extraction techniques. A matrix of an ultra-tight unconventional shale reservoir may be characterized by low permeability and low porosity. To extract hydrocarbons from the ultra-tight shale matrix, secondary and tertiary petroleum extraction techniques seek to maximize oil production through the microscale pore networks that comprise a substantial amount of the porosity in the shale matrix.

A robust understanding of fluid flow through microscale pore networks of hydrocarbon reservoirs may be consequential to extracting the trillions of barrels of oil and gas still housed in shale formations globally. Models of fluid flow through a pore network that incorporates permeability, capillary pressure, fluid saturation, contact angle, wettability may help to elucidate specific steps to be taken during resource development to optimize petroleum production. Even so, techniques for characterizing these microscale pore networks are hindered by the computational expense of modeling microscale pore network and extrapolation errors caused by oversimplified characterization of pore geometries.

As discussed above, ideal modeling of fluid flow through porous media would allow for precise, quick, and repeatable characterization of a porous media sample. In a case where the porous media sample is, for example, a cylindrical core sample of a rock having a length of six inches and a diameter of one inch, the core sample is likely to have porosity and permeability characteristics that vary across its length and width. This is common in core samples and especially in core samples representative of ultra-tight oil formations. Geological processes that form certain oil-bearing rocks can produce heterogeneous morphological features in the rock that may be present even at a micrometer scale. This is especially true for oil-bearing carbonate rocks, which contain micro-porosities that contribute significantly to the overall porosity of the rock. These microscale morphological features may affect the pore network of the core sample, altering the porosity and permeability throughout a core sample. Thus, accurate characterization of fluid flow through a core sample may depend on precisely ascertained and verifiable microscale geometries sufficient to detect heterogeneous properties of a pore network. Using conventional estimation techniques that cannot consistently capture the heterogeneity and complexity of either the core sample or the fluid-fluid interfaces present therein may result in characterization of a porous media sample that cannot be used to consistently describe fluid flow through the core sample.

According to certain aspects of the present disclosure, non-destructive techniques for extracting capillary pressure and wettability information for porous media samples may be achieved through image analysis and processing. Specifically, certain aspects are directed to a fully automated procedure implemented by one or more CPUs for two- and three-phase image processing and characteristic extraction. The one or more CPUs may extract capillary pressure and contact angle for each meniscus between immiscible fluids from a high-resolution image of a porous media sample (e.g., an image scanned during flooding described with respect to FIG. 2). Such high-resolution images may be two-dimensional (2D) or 3D images of a porous media sample.

In some cases, image processing may be performed by operating systems running in parallel. One or more CPUs may generate capillary and contact angle information using extraction procedure described herein. The one or more CPUs may be used to process images obtained from a micro-CT scanner. The image may be segmented for efficient extraction. In some cases, the image may be too large in size (e.g., 24 gigabytes). Therefore, one or more CPUs operating in parallel may be used to partition portions of the image and perform extraction procedures on smaller sub-volumes. The one or more CPUs may use the segmented images to extract initial fluid-fluid interfaces (FFIs) within the porous media sample, where immiscible fluids meet to form a meniscus. Based on the FFIs, the one or more CPUs may extract surfaces of the FFI menisci, and three-phase contact lines (TCLs) where FFIs intersect with the solid phase. Based on the surfaces of the FFIs and the TCLs, the one or more CPUs may measure the capillary pressure and the contact angle at different locations throughout the image.

According to aspects of the present disclosure, the extraction procedure includes capillary pressure detection and contact angle detection operations, which may be performed by a processing system architecture that includes at least one or more CPUs operating independently. The one or more CPUs perform the extraction procedure according to a non-transitory computer readable medium that causes the one or more CPUs to perform any and all operations of the extraction procedure. Each of the one or more CPUs may be utilized in combination with a memory having the computer readable medium stored thereon. Each of the one or more CPUs may be utilized in combination with one or more processors. Each of the one or more processors may be parallel processors. Each of the CPUs may operate independently, or may use a message passing interface (MPI) enabling communication between one or more parallel processors for performing the extraction procedure.

Figure 3:
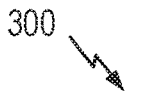
FIG. 3 depicts an example analysis workflow for in-situ characterization of capillary pressure and wettability by one or more central processing units (CPU).

FIG. 3 illustrates an example extraction procedure for characterization of porous media by one or more CPUs. At 302, a micro-CT captures a raw image of a porous media sample (e.g., during flooding described with respect to FIG. 2). The raw image may be a 3D image. At 304, the image is processed to obtain a set of segmented images. In some cases, the image may be processed by using commercial software (e.g., Avizo). A 306, the set of segmented images is divided among the one or more CPUs. The one or more CPUs then extract FFIs at 308, and smooth FFIs at 310. At 312, the one or more CPUs compute the FFI curvatures. At 314, the one or more CPUs use the curvature values of the smoothed FFI of the porous media sample to determine capillary pressure. In one example, capillary pressure is determined for each meniscus detected within the set of segmented images. Using the smoothed FFIs of 310, the one or more CPUs extract TCLs at 316. At 318, the one or more CPUs generate a set of 2D slices perpendicular to the TCLs. At 320, the one or more CPUs process the 2D slices. In one example, processing includes identifying the phases present at each pixel and defining tangential relationships between each adjacent phase. At 322, the one or more CPUs determine contact angles present where each contact point between immiscible fluids meets a solid phase. Contact angle is measured as the angle between the tangents to the fluid-fluid interface (FFI) and the fluid-solid interface (FSI). At 324, the one or more CPUs analyze the extracted characterization information and output one or more visual representations of the characterization.

Figure 4A:
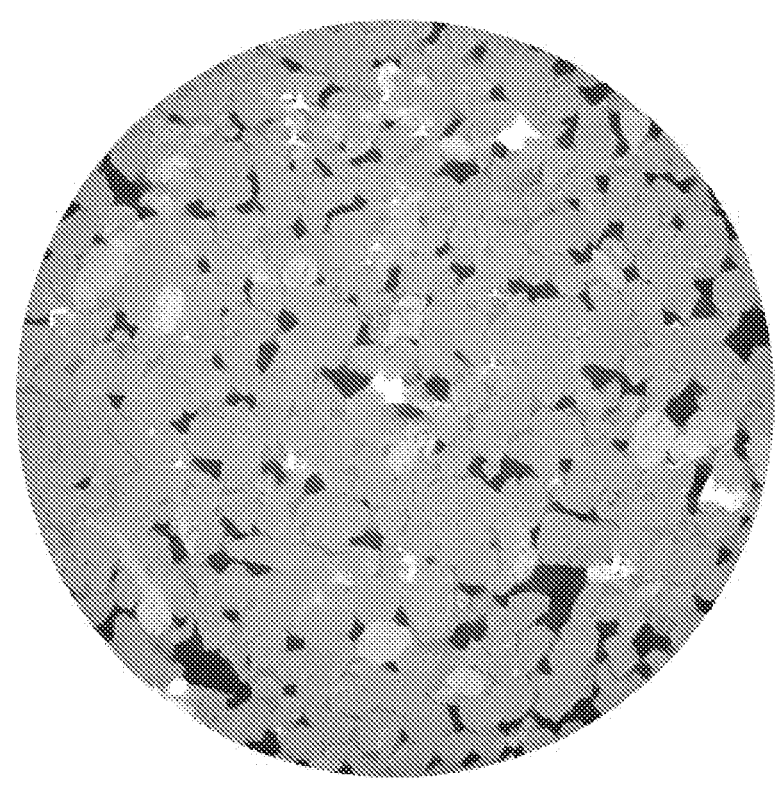
FIG. 4A depicts an example set of high-resolution porous media image taken by a scanning instrument from a single rock sample.

The extraction procedure of FIG. 3 begins with a micro-CT scan of a porous media sample, resulting in a raw image. After the raw image is generated, the one or more CPUs obtain the raw image and begin optimizing the raw image for further use. The CPUs process the image to enhance microscale porosities visualized in the image. This processing may reduce noise and error, which in turn reduces the likelihood of fluid estimation errors occurring later in a pore network extraction procedure. FIG. 4A represents a 2D cross sectional view of a processed CT image of a saturated natural porous media. In FIG. 4A, the image has been corrected to mitigate potential errors in the imaging process.

Figure 4B:
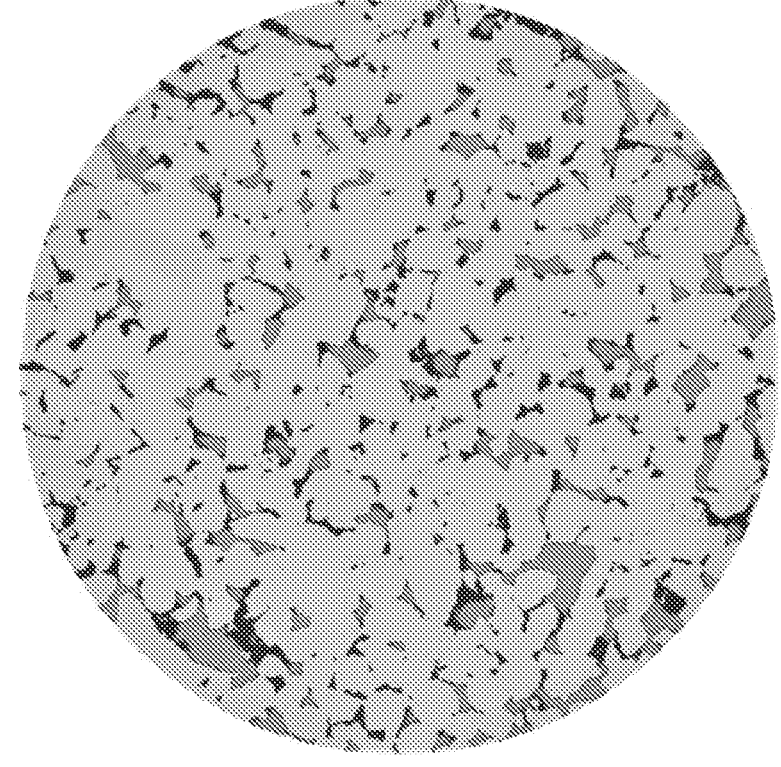
FIG. 4B depicts an example set of high-resolution porous media image taken by a scanning instrument from a single rock sample and segmented for characterization.

The one or more CPUs also segment the processed image to produce a set of segmented images. The segmentation process include the assignment of a unique label for each voxel within the greyscale images to each distinct phase. As shown in FIG. 4B, solid portions represented in the set of greyscale images may be designed by a unique label (shown in FIG. 4B as greyscale intensity, though representation may be presented in color). Immiscible fluid portions represented in the set of greyscale images may be designated according to fluid type. Fluid types include, but are not limited to water, oil, brine, gas, and blood. In some cases, if the image size is large, the platform may perform a partitioning process to divide the image into subvolumes. In FIG. 4B, an oil phase is shown in black, and a water phase is shown in a medium-intensity grey. Additionally, if the image size is large, the CPUs may perform a partitioning process to divide the image into subvolumes to better achieve a satisfactory measure of computational efficiency.

Figure 5:
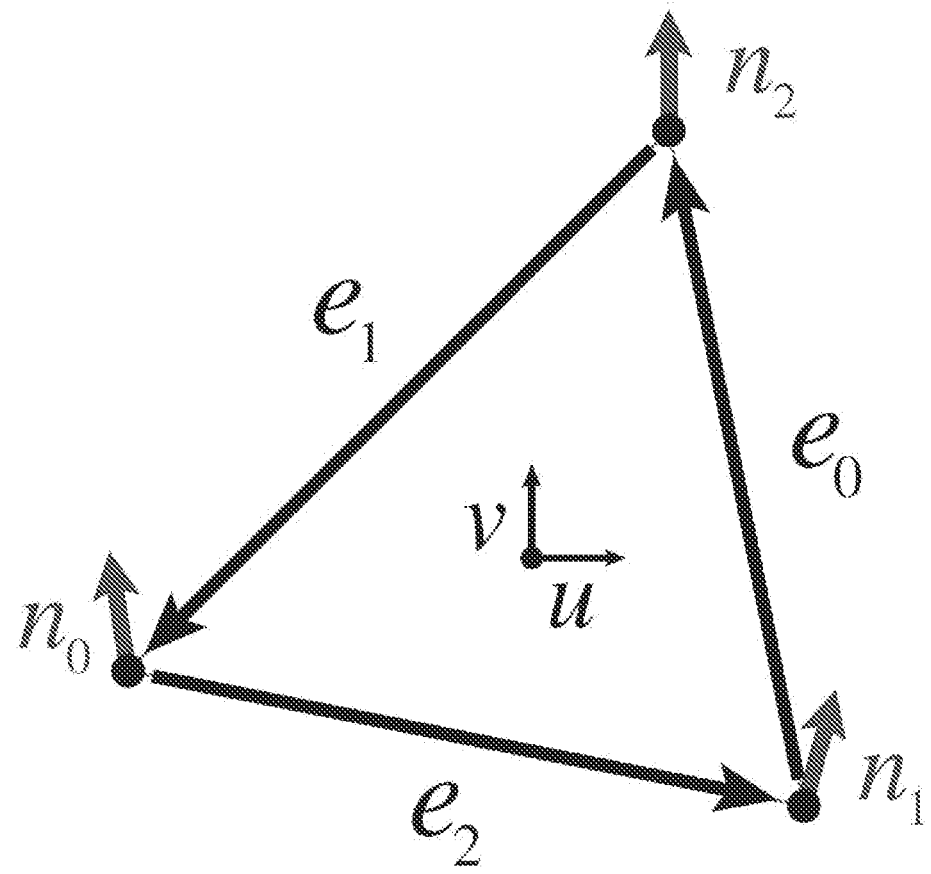
FIG. 5 depicts an example triangular face having normal index values.

After finalizing the set of segmented images, the one or more CPUs may begin an FFI extraction step. The FFI extraction step is part of the broader extraction procedure, and involves ascertaining boundaries between immiscible fluids. For example, in FIG. 4B, where the oil and water phases meet to form menisci, there exists an FFI that may be measured to determine characteristics of the porous material. To extract the FFIs, the CPUs detect the immiscible boundaries between fluid phases. The CPUs may ascertain these FFI boundaries using an implementation of the Marching cubes algorithm to generate a polygonal mesh of the FFI, which consists of triangular faces that cut through image voxels. The CPUs may obtain the coordinates of the triangular face vertices by interpolating between the coordinates of the surrounding voxels. The CPUs form the mesh using consistently oriented faces, so that the normal vectors representative of the FFI surfaces always point from one phase to another. The triangular mesh may represent a discrete representation of the true FFIs. FIG. 5 depicts an example triangular face utilized throughout the mesh. Each of the triangular faces comprises of three vertices (points) and is bounded by three edges (i.e., $e_0$, $e_1$, $e_2$). In certain cases, one or more CPUs exclude the fluid-solid and fluid-other fluids interfaces during the surface extraction step, or find the entire interface and identify the points that belong to that interface.

After generating the mesh, the one or more CPUs smooth the mesh to reduce the impact of image voxelization and fluctuation on later curvature extraction procedures. The CPUs smooth the mesh using an implicit fairing method. The CPUs may perform smoothing to a degree that reduces voxelization artifacts while preserving small features and avoiding shrinkage of the target surface area. In many cases, an extracted curvature value may inherently depend on the number of smoothing iterations. In other words, curvature values may decrease or increase if smoothing is overperformed, causing severe surface deformation. Accordingly, there may be an optimum number of smoothing iterations applied to a mesh to both reduce voxelization and preserve small pore features.

Figures 6A, 6B, 6C:
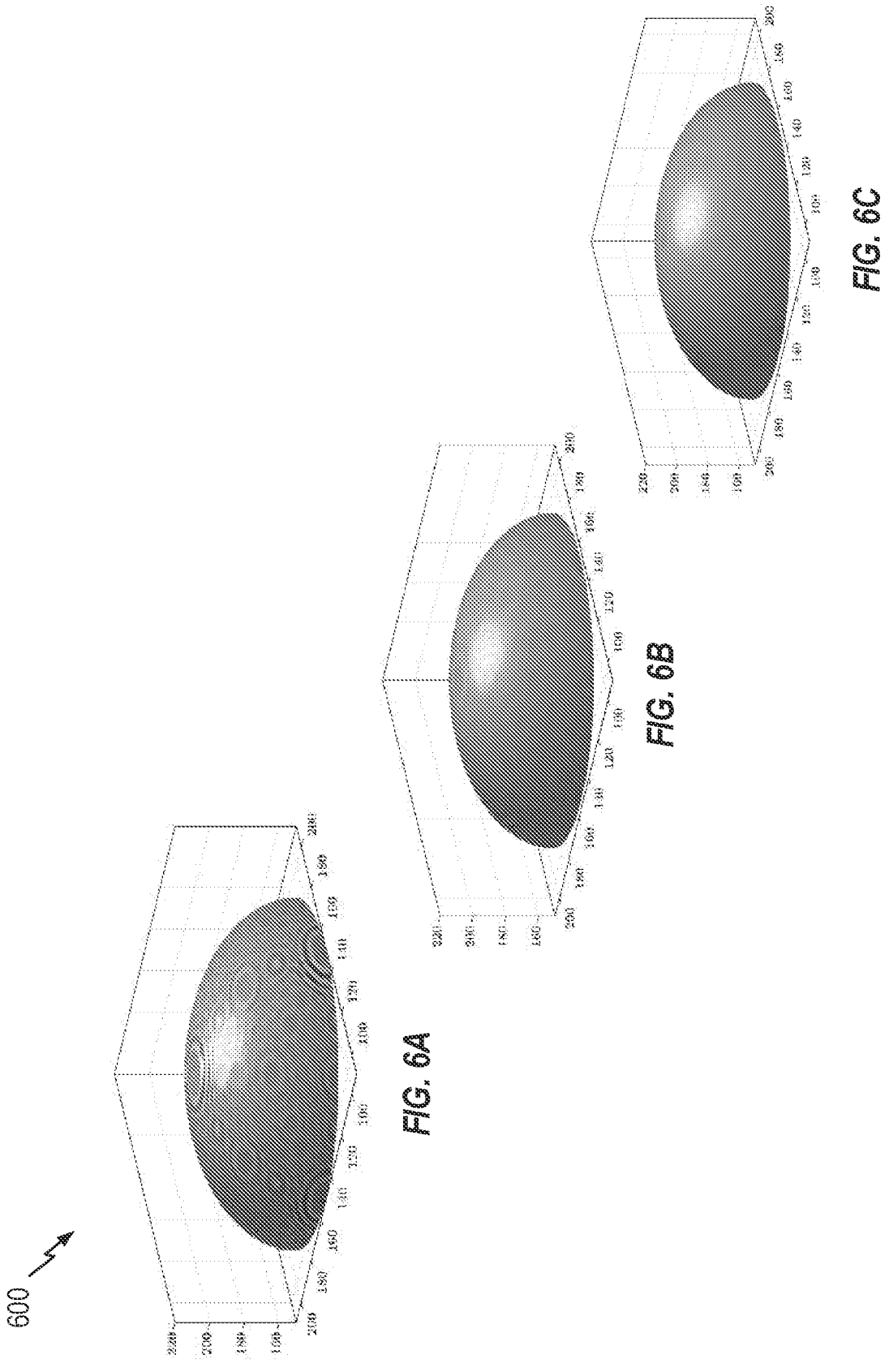
FIG. 6A depicts example curvature smoothing according to aspects of the present disclosure.
FIG. 6B depicts example curvature smoothing according to aspects of the present disclosure.
FIG. 6C depicts example curvature smoothing according to aspects of the present disclosure.

FIGS. 6A, 6B, and 6C illustrate example curvatures on synthetic surfaces ascertained after 1, 7, and 15 smoothing iterations, respectively. In this example, curvature value for each vertex is displayed and has a value in 1/voxel units, falling between 0.2 and −0.2. In many cases, 15 smoothing iterations may be utilized to perform the techniques described herein while preserving the integrity of the results. However, the value for smoothing iterations may vary from 15 depending on the geometries present in the targeted porous media sample.

Three-dimensional continuous surfaces are defined in terms of two independent parameters u and v and a position vector r which is a function in these parameters. In estimating the curvature of the surface, the normal vector to the surface can be defined using the vector product of the directional derivatives of r with respect to u and v, consistent with the following equation:

$$n = \frac{r_u \times r_v}{|r_u \times r_v|}$$

Subsequently, the directional derivatives of n with respect to u and v can be used to find the surface curvature.

The previous concepts can be extended to discrete surfaces. The process includes, in part, that the one or more CPUs may determine n for each triangular face based on the position of two sides of the triangular face. The CPUs also determine partial derivatives of n with respect to u and v. Based on n determined for each triangle face within the mesh, the CPUs ascertain a normal vector for each vertex of each triangular face (e.g., represented as $n_0$, $n_1$, $n_2$ as FIG. 5, and as $n_0$, $n_1$, $n_2$ as presented herein) using at least a weighted average of the normal vectors of surrounding triangular faces. The CPUs then apply each of $e_0$, $e_1$, $e_2$, $n_0$, $n_1$, $n_2$, u, and v to the follow system of equations:

$$II\begin{pmatrix} e_0 \cdot u \\ e_0 \cdot v \end{pmatrix} = \begin{pmatrix} (n_2 - n_1) \cdot u \\ (n_2 - n_1) \cdot v \end{pmatrix}$$

$$II\begin{pmatrix} e_1 \cdot u \\ e_1 \cdot v \end{pmatrix} = \begin{pmatrix} (n_0 - n_2) \cdot u \\ (n_0 - n_2) \cdot v \end{pmatrix}$$

$$II\begin{pmatrix} e_2 \cdot u \\ e_2 \cdot v \end{pmatrix} = \begin{pmatrix} (n_1 - n_0) \cdot u \\ (n_1 - n_0) \cdot v \end{pmatrix}$$

II is equal to a matrix $$\begin{pmatrix} L & M \\ M & N \end{pmatrix}$$

where $L = -n_u \cdot r_u$, $M = -(n_v \cdot r_u + n_u \cdot r_v)/2$, and $N = -n_v \cdot r_v$. The one or more CPUs may determine L, M, and N for each triangle face within the mesh and then estimate a value of this matrix for each vertex of the mesh based on area-weighted averaging procedures.

The one or more CPUs may then ascertain principal curvature values and their corresponding orientations for each of the vertices of the smoothed mesh within the segmented images based in part on II. The CPUs then determine the total curvature of the total FFI boundary discussed above by summing the principal curvature values for each of the vertices within the mesh and averaging those values to obtain a representative surface curvature value for the FFI of interest.

Figure 7:
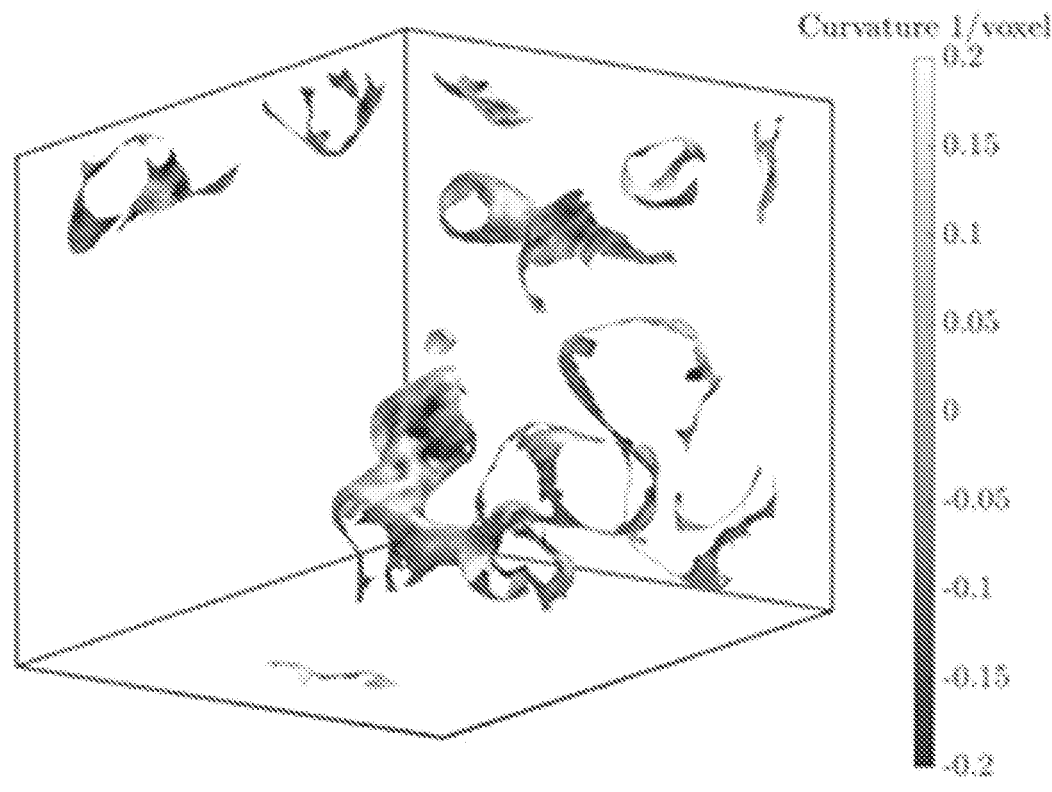
FIG. 7 depicts an example fluid-fluid interface (FM) surface extracted from a porous media sample according to aspects of the present disclosure.
Figure 8:
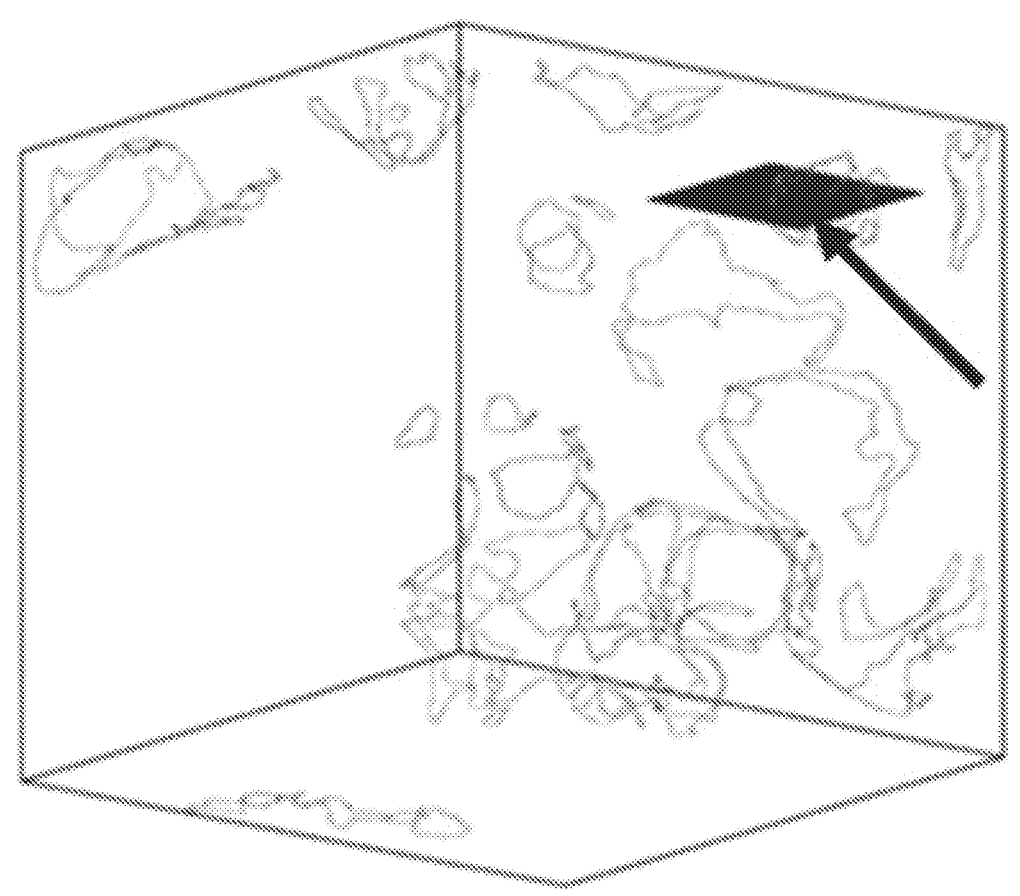
FIG. 8 depicts example three-phase contact lines (TCLs) extracted from a porous media sample according to aspects of the present disclosure.

FIG. 7 illustrates example curvature values for FFIs extracted from a set of 3D segmented images of a porous media sample. In this example, curvature values for each pixel are displayed as a value in units of 1/voxel, falling between 0.2 and −0.2. Extracting curvature according to the procedure described above provides a curvature determination that is stable, robust, and sensitive to local curvature variations in a manner far exceeding techniques that have been developed previously. The curvature extraction step described herein may utilize the smallest possible neighborhood around each triangular face (e.g., one ring of faces around each vertex). As a result, this curvature extraction desirably characterizes small features, such as arc terminal menisci (colloquially, menisci present at rough and hard-to-reach corners within pore spaces) at high capillary pressures.

After obtaining the curvature values, the one or more CPUs may proceed with the capillary pressure calculation operation for each FFI using the curvature values. This operation enables the CPUs to obtain capillary pressure values for each FFI based, at least in part, on the interfacial tension between the wetting phase and the non-wetting phase and the obtained curvature values for that FFI. After obtaining capillary pressure values for each of the of the FFIs across the whole porous media sample, the CPUs may output the capillary pressure and corresponding visualization metrics and analysis related to the output capillary pressures.

In addition to the capillary pressure step, the one or more CPUs may perform a contact angle measurement operation based on the FFIs described above. To determine contact angles within the porous media sample, the CPUs first extract TCLs from the mesh of the FFI. TCLs are lines comprising points within a porous media sample where FFIs meet fluid-solid interfaces (FSIs) (i.e., a "fluid-fluid-solid point", or a "triple-point"). To ascertain TCLs within the set of segmented images, the CPUs identify the boundary edges of the smoothed FFI mesh, and then trace the connectivity of the vertices of the boundary edges in the 3D space to obtain one or more TCLs. The CPUs then smooth the resulting TCL segments. In some cases, the CPUs smooth the TCL segments using a moving average procedure. This TCL extraction approach reduces the computational cost relative to the voxel-based approaches, where one or more TCLs is generated by examining every voxel of a fluid phase, and selecting the voxels that neighbor both the other fluid phase and the solid phase. This TCL extraction approach also preserves the TCL in full, whereas voxel-based techniques often underestimate or overestimate the TCL.

Figure 9A:
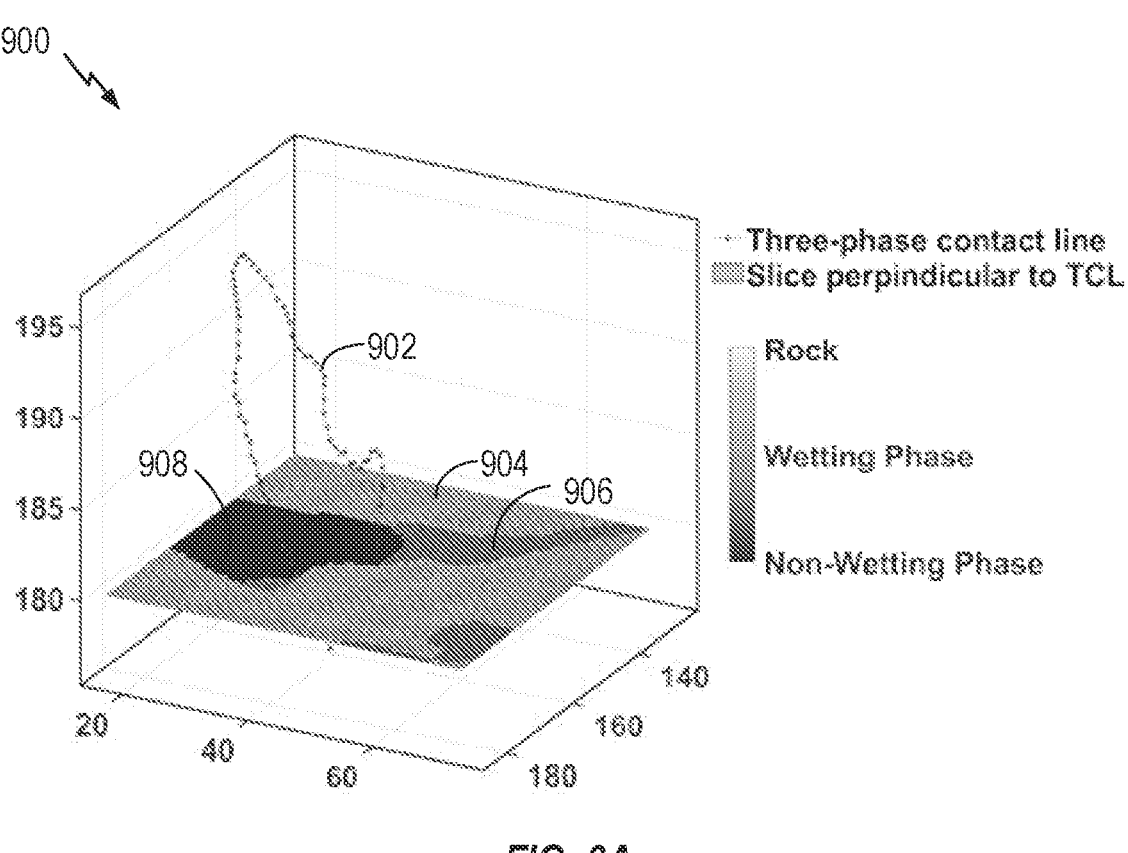
FIG. 9A depicts an example two-dimensional (2D) slice for a porous media sample perpendicular to a point on a TCL.

Contact angles at any given point within a porous media sample may only be measured in a plane that is perpendicular to the TCL at that point. Accordingly, the one or more CPUs may generate a set of 2D slices perpendicular to the one or more smoothed TCLs. To generate these 2D slices, the CPUs trace successive points in the proximity of a defined point "A" for each point on one or more smoothed TCLs. The CPUs then use the coordinates of the point A to define a vector tangential to each point on the one or more TCLs. The CPUs use the tangential vector and the coordinates of points A to generate a perpendicular 2D slice at each point A. FIG. 9A illustrates an example of one 2D slice generated perpendicular to a point on a TCL 902. The TCL intersects with the 2D slice where the rock 904, wetting phase 906, and non-wetting phase 908 meet on the 2D slice.

Figure 9B:
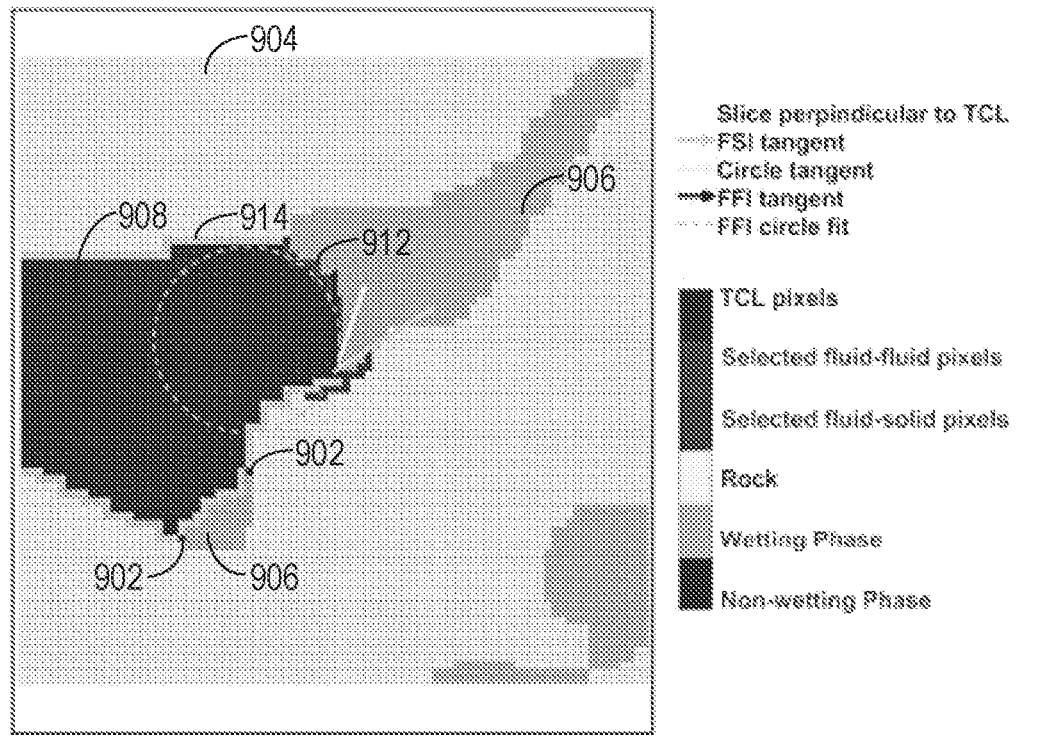
FIG. 9B depicts an example two-dimensional (2D) slice for a porous media sample perpendicular to a point on a TCL.

The one or more CPUs extract a 2D slice for all points on the one or more TCLs. The CPUs process the 2D slices to identify solid phase, wetting phase, non-wetting phase, FFIs, FSIs, and triple-points pixel-wise within each 2D slice. In some portions of a 2D slice, pixels may represent more than one phase. In response, the CPUs may trace and select pixels representing FFIs, FSIs and points on a TCL. FIG. 9B illustrates an example of the one 2D slice of FIG. 9A, where TCL pixels 902, FFI pixels 912, FSI pixels 914, rock/solid pixels 904, wetting phase pixels 906, and non-wetting phase pixels 908 are indicated.

The one or more CPUs examine each 2D slice to identify FSI and FFI pixels and measure the contact angle at each point on the one or more TCL points. In some cases, the CPUs may use a straight line to approximate the solid surface locally. The CPUs use the FFI pixels to ascertain a line tangent to the FFI within the 2D slice using either a circle- or line-fitting method. FIG. 9B illustrates implementations of both methods. To implement the circle-fitting method, the FFI pixels found in a 2D slice are fitted with a circle (dotted circle). The CPUs determine the tangent to this circle ("circle tangent" line), at a TCL point as fluid-fluid line from which the tangent extends. In the line-fitting method, the fluid-fluid line is the line interpolating through the FFI pixels in the 2D slice. After ascertaining a tangent line, the CPUs determine the contact angle for each 2D slice by measuring the angle between the FFI and the FSI through the denser phase. When the circle-fitting method is implemented, the contact angles may be defined as circle-line contact angles. When the line-fitting method is implemented, the contact angles may be defined as two-line contact angles.

In many cases, the one or more CPUs may employ several screening criteria to automatically exclude the erroneous contact angle measurements associated with insufficient phases contact (i.e., poor interfaces) and image artifacts. Criteria may include insufficient fluid-solid contact and insufficient fluid-fluid pixel presence. In certain cases, the CPUs may be equipped with data screening criteria to find and eliminate specific curvature values which may introduce high uncertainty in the analysis. In particular, the CPUs may identify the surface patches below a certain cut-off value and eliminate these patches from the characterization procedure. The CPUs may also exclude the curvature values found at the edge vertices (e.g., outer ring of the surface), outlier values, and values that do not meet certain conditions (e.g., identifying MTM and AM interfaces).

After removing erroneous contact angle measurements, the one or more CPUs may output both capillary pressure values and contact angle values of the porous media sample. The output may include each capillary pressure detected, the location of each detection, the number of capillary pressures detected, and statistics regarding the capillary pressures detected. The output may include each contact angle measured, the location of each measurement, the type of contact angle measurement (i.e., line- or circle-fitting methods), the number of contact angles measured, and statistics regarding the contact angles measured. Additionally, the CPUs may output visualization metrics corresponding to the ascertained characteristics of the porous media sample. These metrics include histograms, data tables, graphical representations, surface visualizations, line visualizations, 2D image slices and the like.

Aspects described herein advantageously facilitate porous media characterization and analysis for all types of interfaces (i.e., oil-water, gas-oil, gas-water, and entire interfaces). Additionally, the one or more CPUs may be equipped to process several input data files/images automatically.

Implementation of aspects of the present disclosure enable characterization of porous media samples sufficient to support more accurate flow simulation using pore network models. An accurate pore network model which uses the capillary pressure and contact angle data, extracted according to aspects described above, may better reflect pore-scale flow behavior through morphological features within porous media having microscale heterogeneity. Users, such as, researchers or engineers who may develop or use techniques described herein for developing conventional or unconventional reservoirs for petroleum production are able to obtain a more robust understanding of fluid flow through porous media on the pore-scale level through proper implementation of techniques described herein. For example, during core flooding experiments, a user may be better equipped to obtain in-situ capillary pressure and contact angle information to monitor the changes in the porous medium system in response to the different practices or processes. The techniques described herein reduce porous media sample characterization errors to the benefit of all users seeking a more comprehensive understanding of any given porous media.

Example Methods

FIG. 10 depicts a method 1000 for in-situ characterization of porous media by one or more CPUs, such as the CPUs of characterization device 1100 of FIG. 11.

Method 1000 begins at 1002 with one or more CPUs obtaining one or more segmented images from a set of images of a porous media sample. In one example, the porous media sample includes a digital rock sample.

Method 1000 continues to operation 1004 with one or more CPUs determining one or more fluid-fluid interfaces (FFIs) within one or more segmented images for each pixel of the one or more segmented images. In one example, determining one or more FFIs includes determining at least one volume associated with one or more phases within the one or more segmented images. In one example, determining one or more FFIs includes extracting one or more initial FFIs from the one or more segmented images, generating the one or more FFIs by smoothing the one or more initial FFIs, and determining a surface curvature at each point of the one or more FFIs. Extracting one or more initial FFIs includes generating a triangular mesh, wherein each triangle of the triangular mesh traverses one or more voxels within the one or more segmented images. Generating the one or more FFIs by smoothing may include applying an implicit fairing integration to a triangular mesh.

Method 1000 continues to operation 1006 with one or more CPUs, based on at least in part on the FFIs, extracting one or more characteristics of the porous media sample. In one example, extracting one or more characteristics of the porous media sample includes determining capillary pressures for the porous media sample based at least in part on a curvature measured at each vertex defined within a triangular mesh. Extracting one or more characteristics of the porous media sample includes determining one or more capillary pressures for the one or more FFIs based at least in part on interfacial tension between the wetting phase and the non-wetting phase and a curvature. In one example, extracting one or more characteristics of the porous media sample includes determining one or more three-phase contact lines (TCLs) within the one or more segmented images, generating one or more two-dimensional (2D) slices of the one or more TCLs, processing the one or more 2D slices to map each pixel of the one or more 2D slices to at least one of a TCL, an FFI, a fluid-solid interface (FSI), a solid, a wetting phase, or a non-wetting phase,determining one or more contact angles of the porous media sample, and extracting a set of acceptable 2D slices from the one or more 2D slices based on an a number of pixels representing the FFI and the FSI present within each slice.

Processing the one or more 2D slices includes mapping each pixel of the one or more 2D slices to identify one point of a TCL, an FFI, a FSI, a solid, a wetting phase, or a non-wetting phase. The one or more TCLs include fluid-fluid-solid contact points. Determining one or more contact angles includes at least one of measuring one or more contact angles based on a set of tangents associated with a set of FFIs, and measuring one or more contact angles based on a set of tangents associated with a set of FSIs. Determining one or more TCLs includes extracting initial TCLs within the one or more segmented images based at least in part on boundary edges identified in a triangular mesh generated from the one or more FFIs and a connectivity of vertices of the boundary edges in three-dimensional (3D) space, and generating the one or more TCLs by smoothing the one or more initial TCLs. Generating the one or more 2D slices of the one or more segmented images perpendicular to each of the one or more TCLs includes generating a set of successive points for each of the one or more TCLs in proximity to a starting point on each of the one or more TCLs, determining a vector tangential to each of the one or more TCLs, and generating the one or more 2D slices based, at least in part, on the vector and coordinates of the starting point. Processing the one or more 2D slices includes extracting at least one sub-slice surrounding a target point from the one or more 2D slices, determining pixels within the at least one sub-slice to represent a TCL, a FFI, a FSI, a solid, a wetting phase, or a non-wetting phase, and generating a tangent to the solid surface based at least in part on the pixels representing the FSI.

Method 1000 further includes one or more CPUs obtaining, from a scanning instrument, the set of images of the porous media sample.

Method 1000 further includes outputting the one or more characteristics of the porous media sample, and outputting data and visualization metrics corresponding to the one or more characteristics of the porous media sample.

In one aspect, method 1000, or any aspect related to it, may be performed by an apparatus, such as characterization device 1100 of FIG. 11, which includes various components operable, configured, or adapted to perform the method 1000. Characterization device 1100 is described below in further detail.

Note that FIG. 10 is just one example of a method, and other methods including fewer, additional, or alternative operations are contemplated consistent with this disclosure.

Example Device

FIG. 11 depicts aspects of an example porous media characterization device 1100. In some aspects, the characterization device 1100 includes one or more CPUs as described with respect to FIG. 3.

The characterization device 1100 includes a CPU processing system 1104 coupled to an image interface 1102 (e.g., a user interface or and/or an image generator). The CPU processing system 1104 may be configured to perform processing functions for the characterization device 1100, including in-situ flow characterization of porous media generated by the characterization device 1100.

The CPU processing system 1104 includes one or more processors 1110. The one or more processors 1110 are coupled to a computer-readable medium/memory 1112 via a bus. The one or more processors 1110 and the computer-readable medium/memory 1112 may communicate with each other via a message passing interface (MPI) 1008. In certain aspects, the computer-readable medium/memory 1112 is configured to store instructions (e.g., computer-executable code) that when executed by the one or more processors 1110, cause the one or more processors 1110 to perform the method 1000 described with respect to FIG. 10, or any aspect related to it. Note that reference to a processor performing a function of characterization device 1100 may include one or more processors performing that function of characterization device 1100.

In the depicted example, computer-readable medium/memory 1112 stores code (e.g., executable instructions) for generating 1130, code for determining 1132, code for extracting 1134, code for obtaining 1136, code for outputting 1138, and code for processing 1140. Processing of the code

1130-1140 may cause the characterization device 1100 to perform the method 1000 described with respect to FIG. 10, or any aspect related to it.

The one or more processors 1110 include circuitry configured to implement (e.g., execute) the code stored in the computer-readable medium/memory 1112, including circuitry for generating 1118, circuitry for determining 1120, circuitry for extracting 1122, circuitry for obtaining 1124, circuitry for outputting 1126, and circuitry for processing 1128. Processing with circuitry 1118-1128 may cause the characterization device 1100 to perform the method 1000 described with respect to FIG. 10, or any aspect related to it.

Various components of the characterization device 1100 may provide means for performing the method 1000 described with respect to FIG. 10, or any aspect related to it.

Example Aspects

Implementation examples are described in the following numbered clauses:

Aspect 1: A method for porous media characterization by one or more central processing units (CPUs), comprising obtaining one or more segmented images from a set of images of a porous media sample, determining one or more fluid-fluid interfaces (FFIs) within one or more segmented images for each pixel of the one or more segmented images, and, based on at least in part on the one or more FFIs, extracting one or more characteristics of the porous media sample.

Aspect 2: The method of aspect 1, further comprising: obtaining, from a scanning instrument, the set of images of the porous media sample.

Aspect 3: The method of any one of aspects 1-2, further comprising: outputting the one or more characteristics of the porous media sample, and outputting data and visualization metrics corresponding to the one or more characteristics of the porous media sample.

Aspect 4: The method of any one of aspects 1-3, wherein determining one or more FFIs comprises determining at least one volume associated with one or more phases within the one or more segmented images.

Aspect 5: The method of any one of aspects 1-4, wherein determining one or more FFIs comprises extracting one or more initial FFIs from the one or more segmented images generating the one or more FFIs by smoothing the one or more initial FFIs, and determining a surface curvature at each point of the one or more FFIs.

Aspect 6: The method of aspect 5, wherein extracting one or more initial FFIs comprises generating a triangular mesh, wherein each triangle of the triangular mesh traverses one or more voxels within the one or more segmented images.

Aspect 7: The method of any one of aspects 5-6, wherein generating the one or more FFIs by smoothing comprises applying an implicit fairing integration to a triangular mesh.

Aspect 8: The method of any one of aspects 1-7, wherein extracting one or more characteristics of the porous media sample comprises determining capillary pressures for the porous media sample based at least in part on a curvature measured at each vertex defined within a triangular mesh.

Aspect 9: The method of aspect 8, wherein extracting one or more characteristics of the porous media sample comprises determining one or more capillary pressures for the one or more FFIs based at least in part on interfacial tension between the wetting phase and the non-wetting phase and a curvature.

Aspect 10: The method of any one of aspects 1-9, wherein extracting one or more characteristics of the porous media sample comprises determining one or more three-phase contact lines (TCLs) within the one or more segmented images, generating one or more two-dimensional (2D) slices of the one or more segmented images perpendicular to each of the one or more TCLs, processing the one or more 2D slices to map each pixel of the one or more 2D slices to at least one of: a TCL, an FFI, a fluid-solid interface (FSI), a solid, a wetting phase, or a non-wetting phase, and determining one or more contact angles of the porous media sample.

Aspect 11: The method of aspect 10, wherein processing the one or more 2D slices comprises mapping each pixel of the one or more 2D slices to identify one point of a TCL, an FFI, a fluid-solid interface (FSI), a solid, a wetting phase, or a non-wetting phase.

Aspect 12: The method of any one of aspects 10-11, wherein the one or more TCLs comprise fluid-fluid-solid contact points.

Aspect 13: The method of any one of aspects 10-12, wherein determining one or more contact angles comprises at least one of: measuring one or more contact angles based on a set of tangents associated with a set of FFIs, and measuring one or more contact angles based on a set of tangents associated with a set of FSIs.

Aspect 14: The method of any one of aspects 10-13, wherein determining one or more TCLs comprises: extracting initial TCLs within the one or more segmented images based at least in part on boundary edges identified in a triangular mesh generated from the one or more FFIs and a connectivity of vertices of the boundary edges in three-dimensional (3D) space, and generating the one or more TCLs by smoothing the one or more initial TCLs.

Aspect 15: The method of any one of aspects 10-14, wherein generating the one or more 2D slices of the one or more segmented images perpendicular to each of the one or more TCLs comprises: generating a set of successive points for each of the one or more TCLs in proximity to a starting point on each of the one or more TCLs, determining a vector tangential to each of the one or more TCLs, and generating the one or more 2D slices based, at least in part, on the vector and coordinates of the starting point.

Aspect 16: The method of any one of aspects 10-15, wherein processing the one or more 2D slices comprises extracting at least one sub-slice surrounding a target point from the one or more 2D slices, determining pixels within the at least one sub-slice to represent a TCL, a FFI, a FSI, a solid, a wetting phase, or a non-wetting phase, and generating a tangent to the solid surface based at least in part on the pixels representing the FSI.

Aspect 17: The method of any one of aspects 10-16, further comprising extracting a set of acceptable 2D slices from the one or more 2D slices based on an a number of pixels representing the FFI and the FSI present within each slice.

Aspect 18: The method of any one of aspects 1-17, wherein the porous media sample is a digital rock sample.

Aspect 19: A method for porous media characterization by one or more CPUs, comprising obtaining, from a scanning instrument, a set of images of a porous media sample, extracting one or more initial FFIs within one or more segmented images extracted from the set of images by generating a triangular mesh representative of the one or more initial FFIs, generating one or more FFIs by smoothing the triangular mesh, determining surface curvature at each point of the triangular mesh, based on at least in part on the one or more FFIs or the surface curvature, extracting one or more characteristics of the porous media sample, wherein the one or more characteristics include capillary pressures and contact angles, and outputting the one or more characteristics of the porous media sample and data and visualization metrics corresponding to the one or more characteristics of the porous media sample.

Aspect 20: The method of aspect 19, wherein extracting one or more characteristics of the porous media sample comprises determining one or more TCLs within the one or more segmented images, generating one or more 2D slices of the one or more segmented images perpendicular to each of the one or more TCLs, processing the one or more 2D slices to map each pixel of the one or more 2D slices to one of a TCL, an FFI, a FSI, a solid, a wetting phase, or a non-wetting phase, and determining one or more contact angles of the porous media sample.

Aspect 21: The method of any one of aspects 19-20, wherein determining the surface curvature comprises determining a tensor value for each triangle within the triangular mesh to determine normal vectors for each triangle, and determining principal curvatures for each point along the one or more FFIs based on the normal vectors.

Aspect 22: The method of aspect 21, wherein the principal curvatures comprise a minimum curvature and a maximum curvature along the one or more FFIs.

Aspect 22: An apparatus, comprising: a memory comprising executable instructions; and a processor configured to execute the executable instructions and cause the apparatus to perform a method in accordance with any one of Aspects 1-21.

Aspect 23: An apparatus, comprising means for performing a method in accordance with any one of Aspects 1-21.

Aspect 24: A non-transitory computer-readable medium comprising executable instructions that, when executed by a processor of an apparatus, cause the apparatus to perform a method in accordance with any one of Aspects 1-21.

Aspect 25: A computer program product embodied on a computer-readable storage medium comprising code for performing a method in accordance with any one of Aspects 1-21.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory) and the like. Also, "determining" may include resolving, selecting, choosing, establishing, and the like.

As used herein, the term "generating" encompasses a wide variety of actions. For example, "generating" may include calculating, computing, processing, deriving, investigating, simulating, modelling, looking up (e.g., looking up in a table, a database or another data structure), ascertaining and the like. Also, "generating" may include receiving (e.g., receiving information), accessing (e.g., accessing data in a memory) and the like. Also, "generating" may include resolving, selecting, choosing, establishing, and the like.

The methods disclosed herein comprise one or more operations or actions for achieving the methods. The method operations and/or actions may be interchanged with one another without departing from the scope of the claims. In other words, unless a specific order of operations or actions is specified, the order and/or use of specific operations and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in the Figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for porous media characterization by one or more central processing units (CPUs), comprising:

obtaining one or more segmented images from a set of images of a porous media sample;

determining one or more fluid-fluid interfaces (FFIs) within one or more segmented images for each pixel of the one or more segmented images; and based at least in part on the one or more FFIs, extracting one or more characteristics of the porous media sample, comprising:

determining one or more three-phase contact lines (TCLs) within the one or more segmented images;

generating one or more two-dimensional (2D) slices of the one or more segmented images perpendicular to each of the one or more TCLs;

processing the one or more 2D slices to map each pixel of the one or more 2D slices to at least one of:

a TCL:

an FFI;

a fluid-solid interface (FSI);

a solid phase;

a wetting phase; or a non-wetting phase; and determining one or more contact angles of the porous media sample.

2. The method of claim 1, further comprising:

obtaining, from a scanning instrument, the set of images of the porous media sample.

3. The method of claim 1, further comprising:

outputting one or more characteristics of the porous media sample; and outputting data and visualization metrics corresponding to the one or more characteristics of the porous media sample.

4. The method of claim 1, wherein determining the one or more FFIs comprises determining at least one volume associated with one or more phases within the one or more segmented images.

5. The method of claim 1, wherein determining the one or more FFIs comprises:

extracting one or more initial FFIs from the one or more segmented images;

generating one or more FFIs by smoothing the one or more initial FFIs; and determining a surface curvature at each point of the one or more FFIs.

6. The method of claim 5, wherein extracting the one or more initial FFIs comprises generating a triangular mesh, wherein each triangle of the triangular mesh traverses one or more voxels within the one or more segmented images.

7. The method of claim 5, wherein generating the one or more FFIs by smoothing comprises applying an implicit fairing integration to a triangular mesh.

8. The method of claim 1, wherein extracting the one or more characteristics of the porous media sample comprises determining capillary pressures for the porous media sample based at least in part on a curvature measured at each vertex defined within a triangular mesh.

9. The method of claim 8, wherein extracting the one or more characteristics of the porous media sample comprises determining one or more capillary pressures for the one or more FFIs based at least in part on interfacial tension between a wetting phase and a non-wetting phase and a curvature.

10. The method of claim 1, wherein processing the one or more 2D slices comprises mapping each pixel of the one or more 2D slices to identify one point of a TCL, an FFI, a fluid-solid interface (FSI), a solid, a wetting phase, or a non-wetting phase.

11. The method of claim 1, wherein the one or more TCLs comprise fluid-fluid-solid contact points.

12. The method of claim 1, wherein determining the one or more contact angles comprises at least one of:

measuring one or more contact angles based on a set of tangents associated with a set of FFIs; and measuring one or more contact angles based on a set of tangents associated with a set of FSIs.

13. The method of claim 1, wherein determining the one or more TCLs comprises:

extracting initial TCLs within the one or more segmented images based at least in part on boundary edges identified in a triangular mesh generated from the one or more FFIs and a connectivity of vertices of the boundary edges in three-dimensional (3D) space; and generating the one or more TCLs by smoothing the one or more initial TCLs.

14. The method of claim 1, wherein generating the one or more 2D slices of the one or more segmented images perpendicular to each of the one or more TCLs comprises:

generating a set of successive points for each of the one or more TCLs in proximity to a starting point on each of the one or more TCLs;

determining a vector tangential to each of the one or more TCLs; and generating the one or more 2D slices based, at least in part, on the vector and coordinates of the starting point.

15. The method of claim 1, wherein processing the one or more 2D slices comprises:

extracting at least one sub-slice surrounding a target point from the one or more 2D slices;

determining pixels within the at least one sub-slice to represent a TCL, a FFI, a FSI, a solid, a wetting phase, or a non-wetting phase; and generating a tangent to the solid surface based at least in part on the pixels representing the FSI.

16. The method of claim 1, further comprising extracting a set of acceptable 2D slices from the one or more 2D slices based on a number of pixels representing the FFI and the FSI present within each slice.

17. The method of claim 1, wherein the porous media sample is a digital rock sample.

18. A non-transitory computer-readable medium comprising computer-executable instructions that, when executed by one or more processors, cause one or more central processing units (CPUs) to:

obtain one or more segmented images from a set of images of a porous media sample;

determine one or more fluid-fluid interfaces (FFIs) within one or more segmented images for each pixel of the one or more segmented images; and based at least in part on the one or more FFIs, extract one or more characteristics of the porous media sample, comprising:

determining one or more three-phase contact lines (TCLs) within the one or more segmented images;

generating one or more two-dimensional (2D) slices of the one or more segmented images perpendicular to each of the one or more TCLs;

processing the one or more 2D slices to map each pixel of the one or more 2D slices to at least one of:

a TCL:

an FFI;

a fluid-solid interface (FSI);

a solid phase;

a wetting phase; or a non-wetting phase; and determining one or more contact angles of the porous media sample. 5

19. An apparatus for porous media characterization comprising a memory and one or more central processing units (CPU), the one or more CPUs configured to cause the apparatus to:

obtain one or more segmented images from a set of images of a porous media sample; 10 determine one or more fluid-fluid interfaces (FFIs) within one or more segmented images for each pixel of the one or more segmented images; and based at least in part on the one or more FFIs, extract one or more characteristics of the porous media sample, comprising: 15 determining one or more three-phase contact lines (TCLs) within the one or more segmented images;

generating one or more two-dimensional (2D) slices of the one or more segmented images perpendicular to each of the one or more TCLs; 20 processing the one or more 2D slices to map each pixel of the one or more 2D slices to at least one of:

a TCL; 25 an FFI:

a fluid-solid interface (FSI);

a solid phase;

a wetting phase; or a non-wetting phase; and 30 determining one or more contact angles of the porous media sample.

\* \* \* \* \*